(12) United States Patent
Zetterman et al.

(10) Patent No.: US 8,909,892 B2
(45) Date of Patent: Dec. 9, 2014

(54) METHOD, APPARATUS, AND COMPUTER PROGRAM PRODUCT FOR FAST CONTEXT SWITCHING OF APPLICATION SPECIFIC PROCESSORS

(75) Inventors: Tommi Juhani Zetterman, Espoo (FI); Harri Hirvola, Espoo (FI)

(73) Assignee: Nokia Corporation, Espoo (FI)

( * ) Notice: Subject to any disclaimer, the term of this patent is extended or adjusted under 35 U.S.C. 154(b) by 232 days.

(21) Appl. No.: 13/524,266

(22) Filed: Jun. 15, 2012

(65) Prior Publication Data

US 2013/0339648 A1    Dec. 19, 2013

(51) Int. Cl.
*G06F 15/80* (2006.01)

(52) U.S. Cl.
USPC ..................... 711/170; 711/169; 711/154

(58) Field of Classification Search
CPC ... G06F 9/3816; G06F 9/382; G06F 9/30152; G06F 9/3806; G06F 9/3836; G06F 9/3012; G06F 9/3842; G06F 12/0862; G06F 15/7857
See application file for complete search history.

(56) References Cited

U.S. PATENT DOCUMENTS

| | | | |
|---|---|---|---|
| 5,127,098 A | | 6/1992 | Rosenthal et al. |
| 5,659,706 A | * | 8/1997 | Beard et al. ................ 711/125 |
| 5,761,466 A | * | 6/1998 | Chau .............................. 712/200 |
| 6,061,711 A | | 5/2000 | Song et al. |
| 6,959,316 B2 | | 10/2005 | Parviainen |
| 7,225,446 B2 | | 5/2007 | Whitton |
| 7,420,572 B1 | | 9/2008 | Yue et al. |
| 7,966,519 B1 | | 6/2011 | Aggarwal et al. |
| 2003/0051124 A1 | * | 3/2003 | Dowling ....................... 712/244 |
| 2010/0107174 A1 | | 4/2010 | Suzuki et al. |
| 2010/0115528 A1 | | 5/2010 | Piipponen et al. |
| 2010/0291942 A1 | | 11/2010 | Piipponen et al. |
| 2010/0332798 A1 | | 12/2010 | Doerr et al. |
| 2011/0009069 A1 | | 1/2011 | Parssinen et al. |
| 2011/0082935 A1 | | 4/2011 | Zetterman et al. |

FOREIGN PATENT DOCUMENTS

WO        WO 9411816        5/1994

OTHER PUBLICATIONS

Corporaal, H. TTAs: Missing the ILP Complexity Wall. Journal of Systems Architecture. Jun. 1999, vol. 45, No. 12-13, pp. 949-973. DOI: 10.1016/S1383-7621(98)00046-0. the whole document.
International Search Report for International Application No. PCT/FI2013/050555 mailed Nov. 28, 2013.

(Continued)

*Primary Examiner* — Aimee Li
*Assistant Examiner* — Candice Rankin
(74) *Attorney, Agent, or Firm* — Locke Lord LLP

(57) ABSTRACT

Embodiments of the invention enable fast context switching of application specific processors having functional units with an architecturally visible state. In example embodiments, a processor allocates memory space to store two process control blocks for two active tasks to be performed by the processor comprising one or more custom functional units having a respective processing state not accessible by the processor. A memory controller stores the processing state of the custom functional units currently running a first active task, in a first process control block, in response to a preemptive task switch requirement. The memory controller loads a second processing state of the custom functional units for a second active task, from a second process control block in the memory, in response to the preemptive task switch requirement. The processor may then perform the second active task, based on the second processing state loaded into the custom functional units.

19 Claims, 13 Drawing Sheets

(56) References Cited

OTHER PUBLICATIONS

John L. Hennessy, et al. "Instruction-Level Parallelism: Concepts and Challenges", Chapter Two, Instruction-Level Parallelism and Its Exploitation, Computer Architecture: A Quantitative Approach, Fourth Edition, Morgan Kaufham, 2007, pp. 66-151.

Miika J. Niiranen, Transport Triggered Architectures on FPGA; Technical Report, Tampere University of Technology, Department of Information Technology, Institute of Digital and Computer Systems, Version 1.1, Nov. 17, 2004, pp. 1-60.

Tempesti, et al., A Move Processor for Bio-Inspired Systems, Proceedings of the 2005 NASA/DoD Conference of Evolution Hardware (EH'05), 0-7695-4/05, IEEE Computer Society.

P. Hamalainen, et al., Design of Transport Triggered Architecture Processors for Wireless Encryption, Proceedings of the 2005 8th Euromicro conference on Digital System Design (DSD'05) 0-7695-2433-08/05, IEEE Computer Society.

H. Corporaal, "Transport Triggered Architectures Examined for General Purpose Applications", Sixth Workshop on Computer Systems, Delft, pp. 55-71, Jan. 1993.

Jan Hoogerbrugge, et al., Comparing Software Pipelining for an Operation-Triggered and a Transport-Triggered Architecture, Proceeding CC '92 Proceedings of the 4th International Conference on Compiler Construction, Springer-Verlag London, UK © 1992, ISBN:3-540-55984-1, pp. 219-228.

H. Corporaal, Design of Transport Triggered Architectures, VLSI, 1994, Design Automation of High Performance VLSI Systems. GLSV '94, Proceedings., Fourth Great Lakes Symposium, Mar. 4-5, 1994, Delft Univ. of Technol., pp. 130-135.

Jan Hoogerbrugge, et al., Register File Port Requirements of Transport Triggered Architectures, Delft University of Technology, Department of Electrical Engineering, MICRO 27 Proceedings of the 27th annual international symposium on Microarchitecture, ACM New York, NY, USA © 1994, ISBN:0-89791-707-3, pp. 191-195.

Jan Hoogerbrugge, et al., Automatic Synthesis of Transport Triggered Processors (1995), Proc. First Ann. Conf., Advanced School for Computing and Imaging, Heijen, The Netherlands, 1995.

J. Heikkinen, et al., Design of Transport Triggered Architecture Processor for Discrete Cosine Transform, ASIC/SOC Conference, 2002. 15th Annual IEEE International, pp. 87-91.

P. Jääskeläinen, et al., Reducing Context Switch Overhead with Compiler-Assisted Threading, EUC '08: Proceedings of the 2008 IEEE/IFIP International Conference on Embedded and Ubiquitous Computing—vol. 02 , vol. 02, IEEE Computer Society Washington, DC, USA © 2008, ISBN: 978-0-7695-3492-3, pp. 461-466.

J. Jansen, et al, Partitioned Register File for TTAs, Proceedings of the 28th annual international symposium on Microarchitecture, IEEE Computer Society Press Los Alamitos, CA, USA © 1995, ISBN:0-8186-7349-4, pp. 303-312.

* cited by examiner

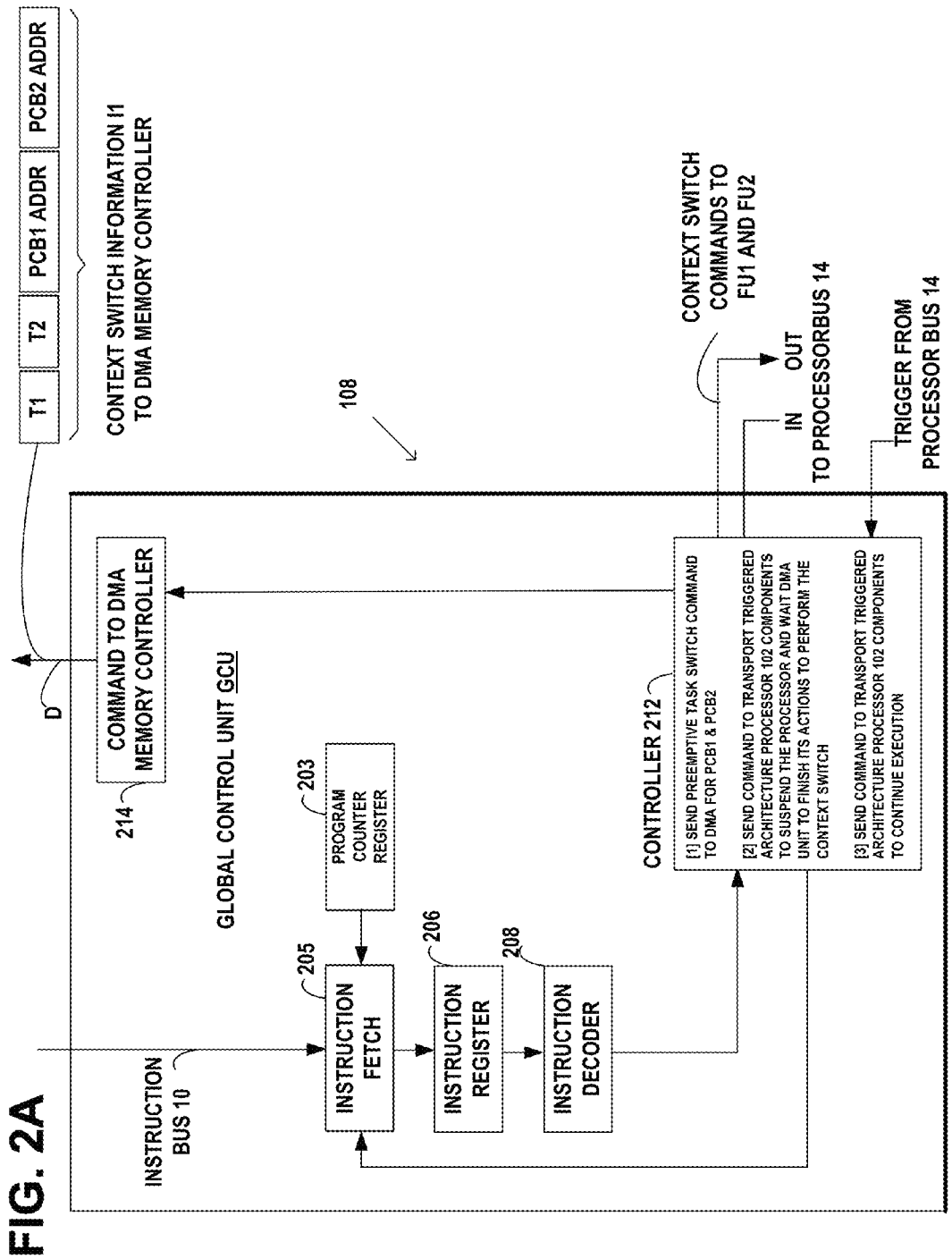

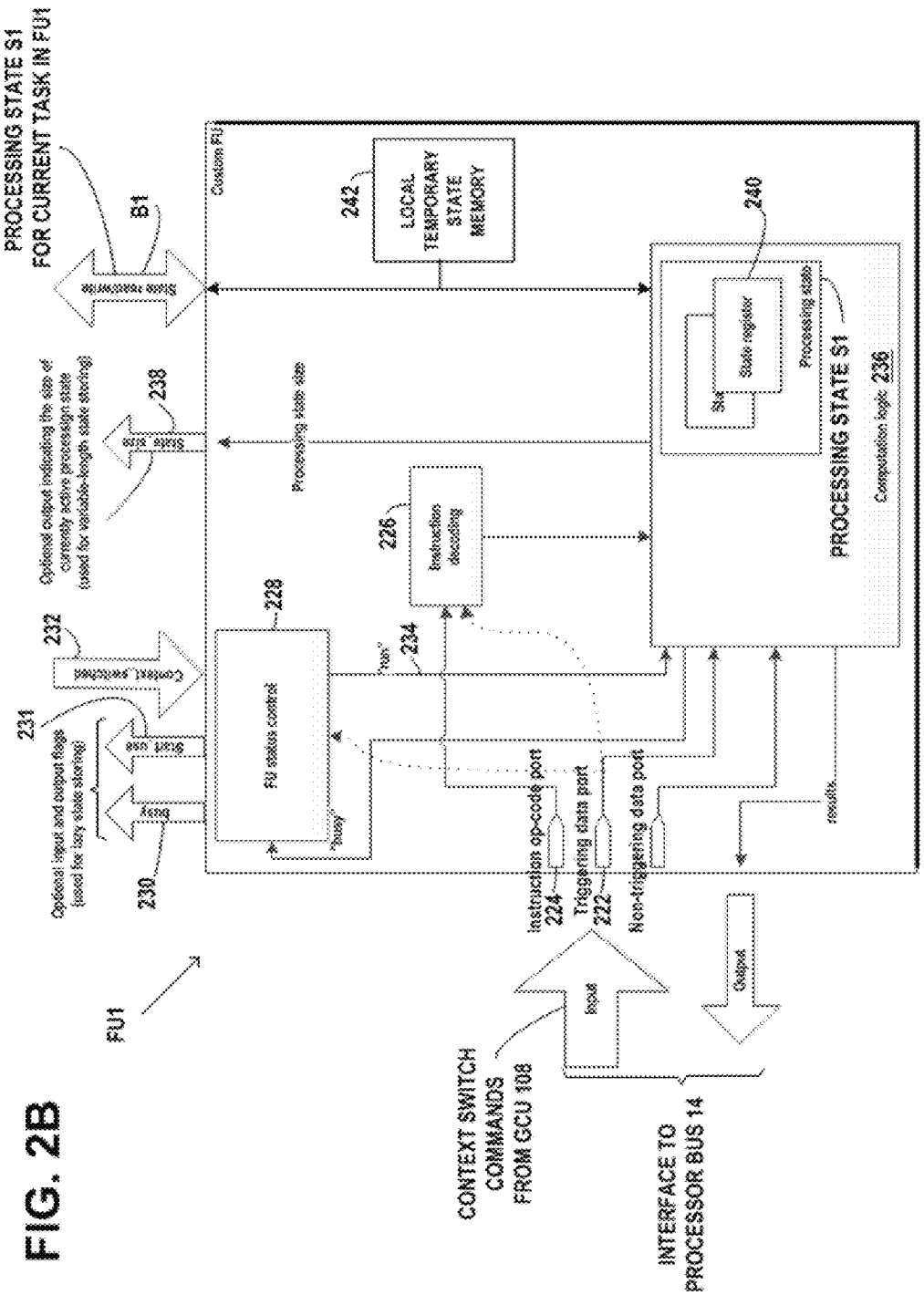

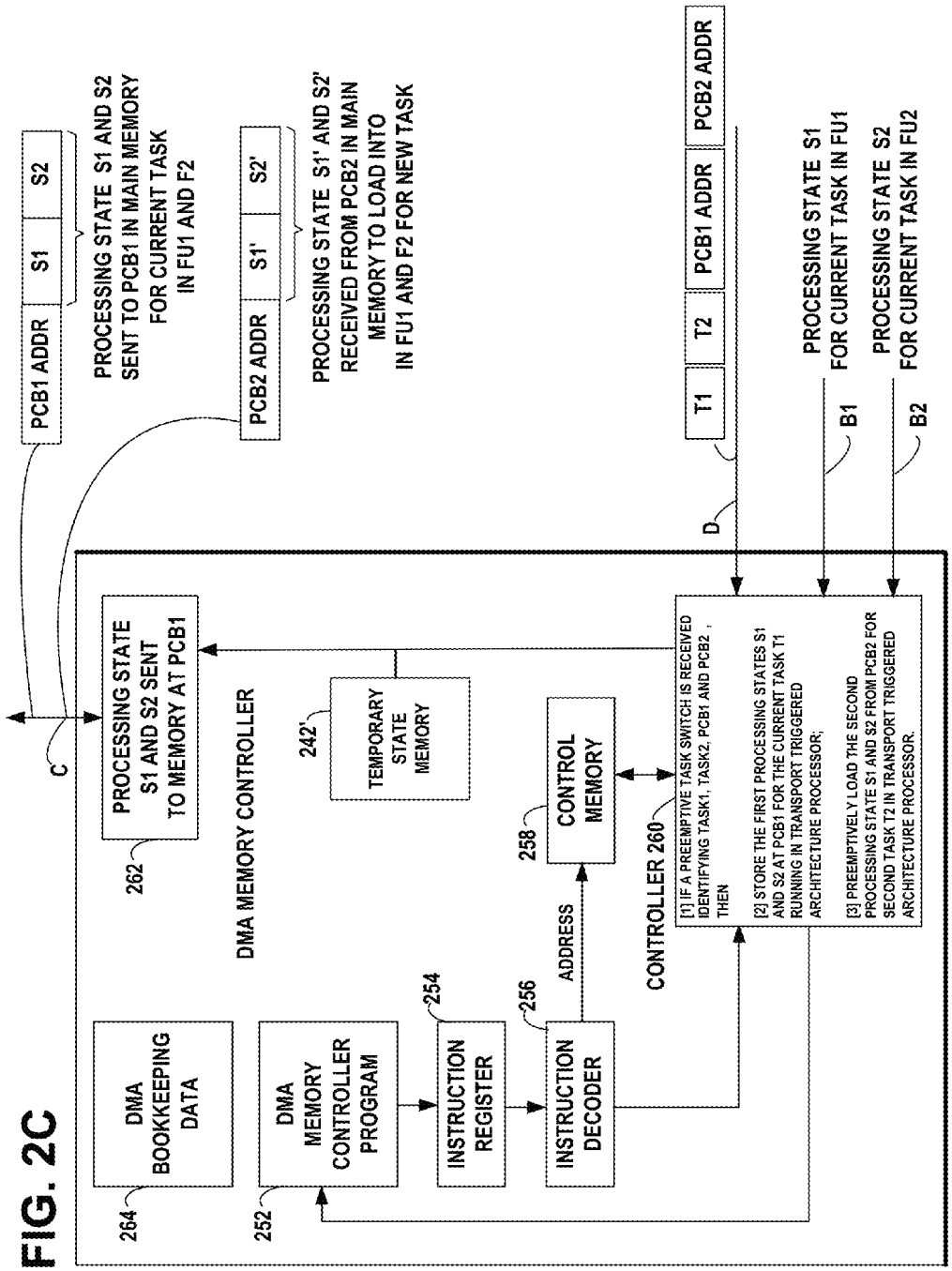

STEP 852: STORING, BY A MEMORY CONTROLLER, A PROCESSING STATE OF ONE OR MORE CUSTOM FUNCTIONAL UNITS OF A PROCESSOR CURRENTLY RUNNING A FIRST ONE OF TWO OR MORE ACTIVE TASKS, IN A FIRST ONE OF TWO OR MORE PROCESS CONTROL BLOCKS IN A MEMORY, IN RESPONSE TO A PREEMPTIVE TASK SWITCH REQUIREMENT, THE ONE OR MORE CUSTOM FUNCTIONAL UNITS THAT ARE PARTS OF AN APPLICATION-SPECIFIC INSTRUCTION-SET PROCESSOR HAVING A RESPECTIVE PROCESSING STATE NOT ACCESSIBLE BY A PROCESSOR RUNNING A REAL TIME OPERATING SYSTEM AND ONE OR MORE APPLICATION PROGRAMS INCLUDING THE TWO OR MORE ACTIVE TASKS; AND

STEP 854: PREEMPTIVELY LOADING, BY THE MEMORY CONTROLLER, THE PROCESSING STATE OF THE ONE OR MORE CUSTOM FUNCTIONAL UNITS WITH A SECOND ONE OF THE TWO OR MORE ACTIVE TASKS, FROM A SECOND ONE OF THE TWO OR MORE PROCESS CONTROL BLOCKS IN THE MEMORY, IN RESPONSE TO THE PREEMPTIVE TASK SWITCH REQUIREMENT OF THE REAL TIME OPERATING SYSTEM, TO ENABLE THE ONE OR MORE CUSTOM FUNCTIONAL UNITS TO PERFORM THE SECOND ONE OF THE TWO OR MORE ACTIVE TASKS.

METHOD, APPARATUS, AND COMPUTER PROGRAM PRODUCT FOR FAST CONTEXT SWITCHING OF APPLICATION SPECIFIC PROCESSORS

FIELD

The embodiments relate to the architecture of integrated circuit computer processors, and more particularly to fast context switching of application specific processors having functional units with an architecturally visible state.

BACKGROUND

Modern society has adopted, and is becoming reliant upon, wireless communication devices for various purposes, such as connecting users of the wireless communication devices with other users. Wireless communication devices may vary from battery powered handheld devices to stationary household and/or commercial devices utilizing an electrical network as a power source. Due to rapid development of the wireless communication devices, a number of areas capable of enabling entirely new types of communication applications have emerged.

Cellular networks facilitate communication over large geographic areas. These network technologies have commonly been divided by generations, starting in the late 1970s to early 1980s with first generation (1G) analog cellular telephones that provided baseline voice communications, to modern digital cellular telephones. GSM is an example of a widely employed 2G digital cellular network communicating in the 900 MHZ/1.8 GHZ bands in Europe and at 850 MHz and 1.9 GHZ in the United States. While long-range communication networks, like GSM, are a well-accepted means for transmitting and receiving data, due to cost, traffic and legislative concerns, these networks may not be appropriate for all data applications.

Bluetooth™ is an example of a short-range wireless technology quickly gaining acceptance in the marketplace. In addition to Bluetooth™ other popular short-range communication technologies include Bluetooth™ Low Energy, IEEE 802.11 wireless local area network (WLAN), Wireless USB (WUSB), Ultra Wide-band (UWB), ZigBee (IEEE 802.15.4, IEEE 802.15.4a), and ultra high frequency radio frequency identification (UHF RFID) technologies. All of these wireless communication technologies have features and advantages that make them appropriate for various applications.

Traditional telephones have evolved into smart phones that have advanced computing ability and wireless connectivity. A modern Smartphone typically includes a high-resolution touch screen, a web browser, GPS navigation, speech recognition, sound synthesis, a video camera, Wi-Fi, and mobile broadband access, combined with the traditional functions of a mobile phone. Providing so many sophisticated technologies in a small, portable package, has been possible by implementing the internal electronic components of the Smartphone in high density, large scale integrated circuitry.

SUMMARY

Method, apparatus, and computer program product embodiments of the invention are disclosed for fast context switching of application specific processors having functional units with an architecturally visible state.

In an example embodiment of the invention, a method comprises:

allocating in a memory, by a processor, memory space to store two or more process control blocks for two or more active tasks to be performed by the processor comprising one or more custom functional units having a respective processing state not accessible by the processor, the processor running a real time operating system and one or more application programs including the two or more active tasks;

configuring, by the processor, a memory controller to store a first processing state of the one or more custom functional units currently running a first one of the two or more active tasks, in a first one of the two or more process control blocks in the memory, in response to a preemptive task switch requirement of the real time operating system;

configuring, by the processor, the memory controller to load a second processing state of the one or more custom functional units for a second one of the two or more active tasks, from a second one of the two or more process control blocks in the memory, in response to the preemptive task switch requirement of the real time operating system; and causing the processor to perform the second one of the two or more active tasks, based on the second processing state loaded into the one or more custom functional units.

In an example embodiment of the invention, a method comprises:

wherein the memory controller stores in the memory prior to the configuring of the memory controller, commonly required portions of the processing state of the one or more custom functional units.

In an example embodiment of the invention, a method comprises:

wherein the memory controller stores in the memory during background operations the processing state of the one or more custom functional units; and causing the memory controller to maintain a record of the portions of the processing state stored in the memory.

In an example embodiment of the invention, a method comprises:

configuring, by the processor, the memory controller to store the second processing state of the one or more custom functional units currently running the second one of the two or more active tasks, in the second one of the two or more process control blocks in the memory, in response to a second preemptive task switch requirement of the real time operating system;

configuring, by the processor, the memory controller to preemptively load the first processing state of the one or more custom functional units, for the first one of the two or more active tasks, from the first one of the two or more process control blocks in the memory, in response to the second preemptive task switch requirement of the real time operating system; and causing the processor to resume performing the first one of the two or more active tasks, based on the first processing state loaded into the one or more custom functional units.

In an example embodiment of the invention, a method comprises:

reading, by the processor, a status indication of the one or more custom functional units indicating whether the processing state of the one or more custom functional units is waiting to be saved; and stalling, by the processor, the one or more custom functional units until the memory controller saves the processing state of the one or more custom functional units, if status indication indicates that the processing state is waiting to be saved.

In an example embodiment of the invention, a method comprises:

configuring, by the processor, the memory controller to store in the memory a portion of the processing state that is in use, the portion having a size indicated by size information, to store the size information and the portion of the processing state in a process control block in the memory.

In an example embodiment of the invention, a method comprises:

causing the memory controller to store the first processing state of one or more custom functional units, in the first one of two or more process control blocks in the memory, in response to a preemptive task switch requirement; and causing the memory controller to preemptively load the second processing state of the one or more custom functional units for the second one of the two or more active tasks, from the second one of the two or more process control blocks in the memory, in response to the preemptive task switch requirement, to enable the processor to perform the second one of the two or more active tasks.

In an example embodiment of the invention, a method comprises:

wherein the memory controller has previously stored in the memory commonly required portions of the processing state of the one or more custom functional units.

In an example embodiment of the invention, a method comprises:

wherein the memory controller stores in the memory during background operations, of the processing state of the one or more custom functional units; and causing the memory controller to maintain a record of the portions of the processing state stored in the memory.

In an example embodiment of the invention, a method comprises:

causing the memory controller to store the second processing state of the one or more custom functional units currently running the second one of the two or more active tasks, in the second one of the two or more process control blocks in the memory, in response to a second preemptive task switch requirement; and causing the memory controller to preemptively load the first processing state of the one or more custom functional units, for the first one of the two or more active tasks, from the first one of the two or more process control blocks in the memory, in response to the second preemptive task switch requirement, to enable the processor to resume the first one of the two or more active tasks.

In an example embodiment of the invention, a method comprises:

causing the memory controller to store in the memory a portion of the processing state that is in use, the portion having a size indicated by size information, to store the size information and the portion of the processing state in a process control block in the memory.

In an example embodiment of the invention, a method comprises:

reading, by the processor, a status indication of the one or more custom functional units indicating whether a first processing state of the one or more custom functional units currently running a first one of two or more active tasks, is waiting to be saved in a main memory;

causing the first processing state to be copied into a local temporary state memory;

allowing the one or more custom functional units to continue execution of a second one of the two or more active tasks; and causing the first processing state to be transferred to the main memory from the local temporary state memory during background while the one or more custom functional units continue executing the second one of the two or more active tasks.

In an example embodiment of the invention, a method comprises:

causing the memory controller to maintain a record of processing states of the one or more custom functional units to determine at least one of whether the one or more custom functional units has a current processing state that affects future instruction execution on the one or more custom functional units and whether the one or more custom functional units has received an indication of a new preemptive task switch requirement, but the one or more custom functional units has not finished a current instruction execution for a current task;

causing the one or more custom functional units to stop executing any uncompleted current instructions for the current task, if the current processing state of the one or more custom functional units is not a correct processing state needed to perform a new task for the new preemptive task switch requirement;

causing the memory controller to save the current processing state of the one or more custom functional units, and causing the memory controller to load the correct processing state into the one or more custom functional units to perform the new task.

In an example embodiment of the invention, an apparatus comprises:

at least one processor;

at least one memory including computer program code;

the at least one memory and the computer program code configured to, with the at least one processor, cause the apparatus at least to:

allocate in a memory, memory space to store two or more process control blocks for two or more active tasks to be performed by a processor comprising one or more custom functional units having a respective processing state not accessible by the processor, the processor running a real time operating system and one or more application programs including the two or more active tasks;

configure a memory controller to store a first processing state of the one or more custom functional units currently running a first one of the two or more active tasks, in a first one of the two or more process control blocks in the memory, in response to a preemptive task switch requirement of the real time operating system;

configure the memory controller to load a second processing state of the one or more custom functional units for a second one of the two or more active tasks, from a second one of the two or more process control blocks in the memory, in response to the preemptive task switch requirement of the real time operating system; and perform the second one of the two or more active tasks, based on the second processing state loaded into the one or more custom functional units.

In an example embodiment of the invention, an apparatus comprises:

wherein the memory controller stores in the memory prior to the configuring of the memory controller, commonly required portions of the processing state of the one or more custom functional units.

In an example embodiment of the invention, an apparatus comprises:

wherein the memory controller stores in the memory during background operations, the processing state of the one or more custom functional units; and the at least one memory and the computer program code configured to, with the at least one processor, cause the apparatus at least to:

cause the memory controller to maintain a record of the portions of the processing state stored in the memory.

In an example embodiment of the invention, an apparatus comprises:

the at least one memory and the computer program code configured to, with the at least one processor, cause the apparatus at least to:

configure the memory controller to store the second processing state of the one or more custom functional units currently running the second one of the two or more active tasks, in the second one of the two or more process control blocks in the memory, in response to a second preemptive task switch requirement of the real time operating system;

configure the memory controller to preemptively load the first processing state of the one or more custom functional units, for the first one of the two or more active tasks, from the first one of the two or more process control blocks in the memory, in response to the second preemptive task switch requirement of the real time operating system; and resume performing the first one of the two or more active tasks, based on the first processing state loaded into the one or more custom functional units.

In an example embodiment of the invention, an apparatus comprises:

the at least one memory and the computer program code configured to, with the at least one processor, cause the apparatus at least to:

read a status indication of the one or more custom functional units indicating whether the processing state of the one or more custom functional units is waiting to be saved; and stall the one or more custom functional units until the memory controller saves the processing state of the one or more custom functional units, if status indication indicates that the processing state is waiting to be saved.

In an example embodiment of the invention, an apparatus comprises:

the at least one memory and the computer program code configured to, with the at least one processor, cause the apparatus at least to:

configure the memory controller to store in the memory a portion of the processing state that is in use, the portion having a size indicated by size information, to store the size information and the portion of the processing state in a process control block in the memory.

In an example embodiment of the invention, an apparatus comprises:

the at least one memory and the computer program code configured to, with the at least one processor, cause the apparatus at least to:

cause the memory controller to maintain a record of processing states of the one or more custom functional units to determine at least one of whether the one or more custom functional units has a current processing state that affects future instruction execution on the one or more custom functional units and whether the one or more custom functional units has received an indication of a new preemptive task switch requirement, but the one or more custom functional units has not finished a current instruction execution for a current task;

cause the one or more custom functional units to stop executing any uncompleted current instructions for the current task, if the current processing state of the one or more custom functional units is not a correct processing state needed to perform a new task for the new preemptive task switch requirement;

cause the memory controller to save the current processing state of the one or more custom functional units, and cause the memory controller to load the correct processing state into the one or more custom functional units to perform the new task.

In an example embodiment of the invention, an apparatus comprises:

wherein the one or more custom functional units are parts of an application-specific instruction-set processor.

In an example embodiment of the invention, an apparatus comprises:

means for allocating in a memory, by a processor, memory space to store two or more process control blocks for two or more active tasks to be performed by the processor comprising one or more custom functional units having a respective processing state not accessible by the processor, the processor running a real time operating system and one or more application programs including the two or more active tasks; and means for configuring, by the processor, a memory controller to store a first processing state of the one or more custom functional units currently running a first one of the two or more active tasks, in a first one of the two or more process control blocks in the memory, in response to a preemptive task switch requirement of the real time operating system; and means for configuring, by the processor, the memory controller to load a second processing state of the one or more custom functional units for a second one of the two or more active tasks, from a second one of the two or more process control blocks in the memory, in response to the preemptive task switch requirement of the real time operating system; and means for causing the processor to perform the second one of the two or more active tasks, based on the second processing state loaded into the one or more custom functional units.

In an example embodiment of the invention, an apparatus comprises:

means for configuring, by the processor, the memory controller to store the second processing state of the one or more custom functional units currently running the second one of the two or more active tasks, in the second one of the two or more process control blocks in the memory, in response to a second preemptive task switch requirement of the real time operating system; and means for configuring, by the processor, the memory controller to preemptively load the first processing state of the one or more custom functional units, for the first one of the two or more active tasks, from the first one of the two or more process control blocks in the memory, in response to the second preemptive task switch requirement of the real time operating system; and means for causing the processor to resume performing the first one of the two or more active tasks, based on the first processing state loaded into the one or more custom functional units.

In an example embodiment of the invention, an apparatus comprises:

means for reading, by the processor, a status indication of the one or more custom functional units indicating whether the processing state of the one or more custom functional units is waiting to be saved; and means for stalling, by the processor, the one or more custom functional units until the memory controller saves the processing state of the one or more custom functional units, if status indication indicates that the processing state is waiting to be saved.

In an example embodiment of the invention, an apparatus comprises:

means for configuring, by the processor, the memory controller to store in the memory a portion of the processing state that is in use, the portion having a size indicated by size information, to store the size information and the portion of the processing state in a process control block in the memory.

In an example embodiment of the invention, a computer program product comprising:

computer executable program code recorded on a computer readable, non-transitory storage medium, the computer executable program code comprising:

code for allocating in a memory, by a processor, memory space to store two or more process control blocks for two or more active tasks to be performed by a processor comprising one or more custom functional units having a respective processing state not accessible by the processor, the processor running a real time operating system and one or more application programs including the two or more active tasks;

code for configuring, by the processor, a memory controller to store a first processing state of the one or more custom functional units currently running a first one of the two or more active tasks, in a first one of the two or more process control blocks in the memory, in response to a preemptive task switch requirement of the real time operating system;

code for configuring, by the processor, the memory controller to load a second processing state of the one or more custom functional units for a second one of the two or more active tasks, from a second one of the two or more process control blocks in the memory, in response to the preemptive task switch requirement of the real time operating system; and code for causing the processor to perform the second one of the two or more active tasks, based on the second processing state loaded into the one or more custom functional units.

In an example embodiment of the invention, a computer program product comprising:

wherein the memory controller stores in the memory prior to the configuring of the memory controller, commonly required portions of the processing state of the one or more custom functional units.

In an example embodiment of the invention, a computer program product comprising:

wherein the memory controller stores in the memory during background operations of the processing state of the one or more custom functional units; and code for causing the memory controller to maintain a record of the portions of the processing state stored in the memory.

In an example embodiment of the invention, a computer program product comprising:

code for configuring, by the processor, the memory controller to store the second processing state of the one or more custom functional units currently running the second one of the two or more active tasks, in the second one of the two or more process control blocks in the memory, in response to a second preemptive task switch requirement of the real time operating system;

code for configuring, by the processor, the memory controller to preemptively load the first processing state of the one or more custom functional units, for the first one of the two or more active tasks, from the first one of the two or more process control blocks in the memory, in response to the second preemptive task switch requirement of the real time operating system; and code for causing the processor to resume performing the first one of the two or more active tasks, based on the first processing state loaded into the one or more custom functional units.

In an example embodiment of the invention, a computer program product comprising:

code for reading, by the processor, a status indication of the one or more custom functional units indicating whether the processing state of the one or more custom functional units is waiting to be saved; and code for stalling, by the processor, the one or more custom functional units until the memory controller saves the processing state of the one or more custom functional units, if status indication indicates that the processing state is waiting to be saved.

In an example embodiment of the invention, a computer program product comprising:

code for configuring, by the processor, the memory controller to store in the memory a portion of the processing state that is in use, the portion having a size indicated by size information, to store the size information and the portion of the processing state in a process control block in the memory.

In an example embodiment of the invention, a computer program product comprising:

code for causing the memory controller to maintain a record of processing states of the one or more custom functional units to determine at least one of whether the one or more custom functional units has a current processing state that affects future instruction execution on the one or more custom functional units and whether the one or more custom functional units has received an indication of a new preemptive task switch requirement, but the one or more custom functional units has not finished a current instruction execution for a current task;

code for causing the one or more custom functional units to stop executing any uncompleted current instructions for the current task, if the current processing state of the one or more custom functional units is not a correct processing state needed to perform a new task for the new preemptive task switch requirement;

code for causing the memory controller to save the current processing state of the one or more custom functional units, and code for causing the memory controller to load the correct processing state into the one or more custom functional units to perform the new task.

In an example embodiment of the invention, a system comprising:

a processor core configured to run a real time operating system, the processor core including one or more custom functional units coupled to a processor bus in the processor core, the one or more custom functional units having a respective processing state not accessible by the processor bus;

a memory controller in the processor core, coupled to the one or more custom functional units and coupled to a memory, the memory controller configured to control the memory;

a control unit in the processor core, coupled to the processor bus and coupled to the memory controller, the control unit configured to configure the memory controller to store a first processing state of the one or more custom functional units currently running a first one of two or more active tasks, in a first one of two or more process control blocks in the memory, in response to a preemptive task switch requirement of the real time operating system;

the control unit further configured to configure the memory controller to preemptively load a second processing state of the one or more custom functional units for a second one of the two or more active tasks, from a second one of the two or more process control blocks in the memory, in response to the preemptive task switch requirement of the real time operating system; and the control unit further configured to perform the second one of the two or more active tasks, based on the second processing state loaded into the one or more custom functional units.

In an example embodiment of the invention, a system comprising:

the control unit further configured to configure the memory controller to store the second processing state of the one or more custom functional units currently running the second one of the two or more active tasks, in the second one of the two or more process control blocks in the memory, in response to a second preemptive task switch requirement of the real time operating system;

the control unit further configured to configure the memory controller to preemptively load the first processing state of the one or more custom functional units, for the first one of the two or more active tasks, from the first one of the two or more process control blocks in the memory, in response to the second preemptive task switch requirement of the real time operating system; and the control unit further configured to resume performing the first one of the two or more active tasks, based on the first processing state loaded into the one or more custom functional units.

In this manner, embodiments of the invention provide fast context switching of application specific processors having functional units with an architecturally visible state.

DESCRIPTION OF THE FIGURES

FIG. 2A illustrates an example embodiment of the invention, of the global control unit (GCU) of FIG. 1, in accordance with an example embodiment of the invention.

FIG. 2B illustrates an example embodiment of the invention, of a custom functional unit (FU) of FIG. 1, illustrating a processor state, in accordance with an example embodiment of the invention.

FIG. 2C illustrates an example embodiment of the invention, of a DMA memory controller of FIG. 1, in accordance with an example embodiment of the invention.

FIG. 8B illustrates an example embodiment of the invention, of an example flow diagram of the operation of the DMA memory controller of FIG. 1, in accordance with an example embodiment of the invention.

DISCUSSION OF EXAMPLE EMBODIMENTS OF THE INVENTION

Software defined radio baseband applications typically require real-time processing of data that is transferred between different custom functional units (FU) that are parts of an application-specific instruction-set processor (ASIP). Examples of this include in-phase/quadrature phase (I/Q) samples of a received sample stream data that are processed in fast Fourier transform operations. Other examples may include data loaded or unloaded in Long Term Evolution (LTE) Hybrid Automatic Repeat Request (HARQ) buffers. Real-time processing of data with a limited number of processors, is made more efficient by multitasking, where multiple tasks are performed by the same processor during a given period of time. As the custom functional units are parts of the processor, they are shared between multiple tasks. The tasks share the common custom functional unit and memory by scheduling which task may be the one running at any given time, and when another waiting task gets a turn. The act of reassigning a processor from one task to another one is called a context switch. Preemptive multitasking is a type of multitasking where the scheduler may interrupt and suspend the currently running task at arbitrary time in order to start or continue running another task.

However, using preemptive multitasking with application-specific processors such as transport triggered architecture (TTA) processors, is not straightforward. Transport triggered architecture processors typically include a plurality of custom functional units. The custom functional units may have internal states that cannot be accessed by a processor invoking the task switch, in order to preserve the processing state of the currently running task. The internal state of custom functional units is usually not visible and accessible to the processor. In order to accomplish the context switch, the processing state of the currently running task may be stored and the processing state of the preempting task may be substituted for it in the custom functional unit.

Figure 1:
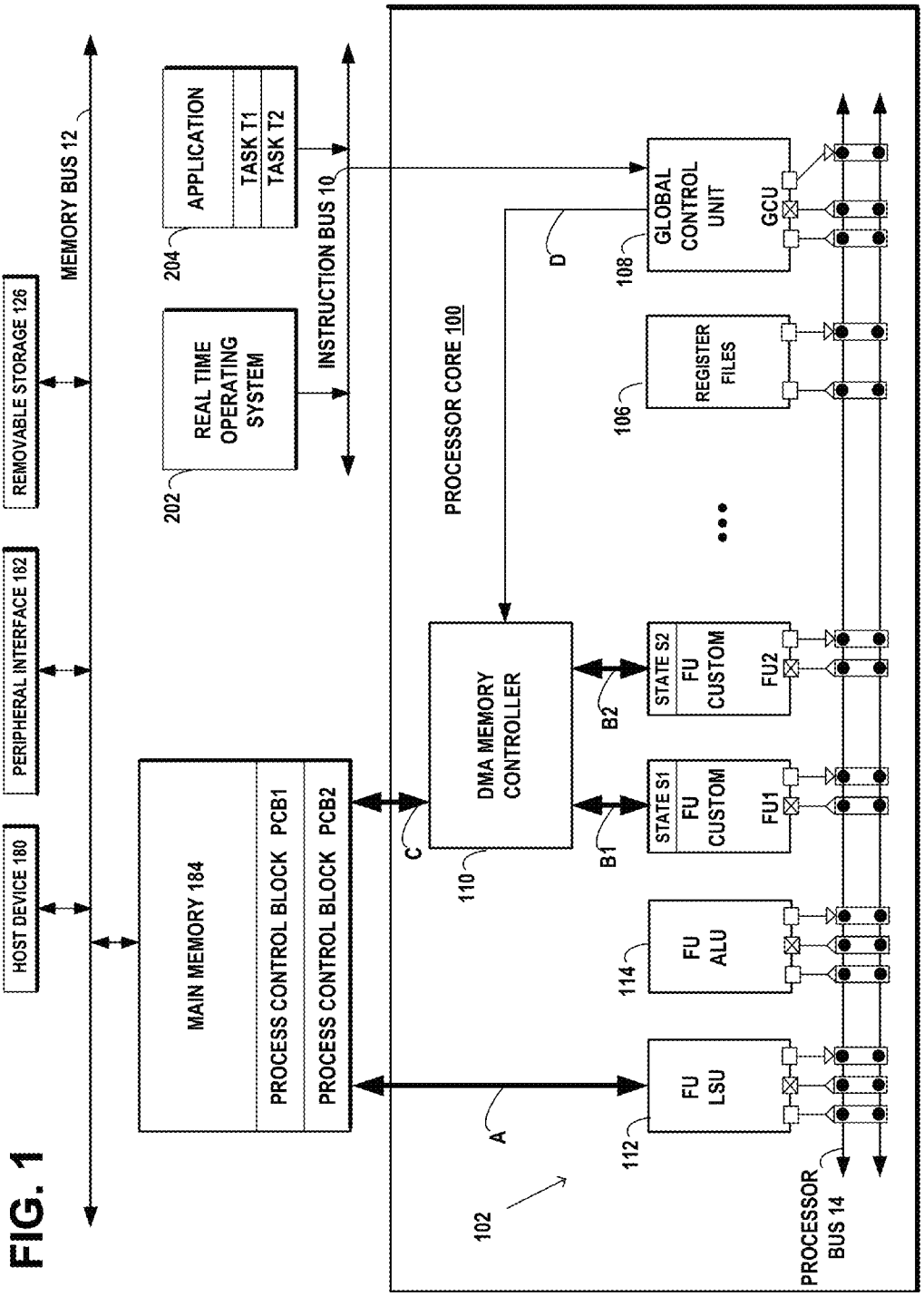
FIG. 1 illustrates an example embodiment of the invention, wherein a system architecture of a processor comprising a plurality of components, referred to herein as a processor core. Here the embodiments have been described for TTA processor. However, the embodiments may be included in any type of application specific processors or other processor architectures. According to one example embodiment of the invention the processor core may be implemented as a transport triggered architecture (TTA) processor comprising one or more custom functional units (FU) that are parts of an application-specific instruction-set processor (ASIP) and a global control unit (GCU) controlling a direct memory access (DMA) memory controller. The one or more custom functional units have a respective processing state not accessible by the processor. The processor allocates memory space in a main memory to store first and second process control blocks (PCBs) with space for the one or more custom functional units. The DMA memory controller stores a first processing state of the custom functional units of a currently running first task in the first process control block. The DMA controller accesses from the second process control block a second processing state of the custom functional units of a second task to be performed by the processor, which the DMA memory controller preemptively loads in the one or more custom functional unit. Preemptive task context switching of the processor with one or more custom functional units is thereby enabled for real time multitasking, in accordance with an example embodiment of the invention.

FIG. 1 illustrates an example embodiment of the invention that enables preemptive task context switching to be performed on a processor with one or more custom functional processors. The figure illustrates a system architecture of a processor comprising a plurality of components, referred to herein as the processor core 100. The processor core 100 maybe implemented as transport triggered architecture (TTA) processor 102 The transport triggered architecture processor 102 comprises one or more custom functional units FU1 and FU2 that may be parts of an application-specific instruction-set processor (ASIP). The transport triggered architecture processor 102 includes a global control unit (GCU) 108 that controls a direct memory access (DMA) memory controller 110. The one or more custom functional units FU1 and FU2 have respective processing states S1 and S2 not accessible by the processor bus 14. The transport triggered architecture processor 102 allocates memory space in a main memory 184 to store first and second process control blocks PCB1 and PCB2, including space for the processing states for the custom functional units FU1 and FU2.

Each PCB may contain all of the task related data needed by the real time operating system (RTOS) 202. Memory allocation for PCBs is managed by the operating system. The storage space for the internal state of the custom FUs is added to the PCB to enable the storage of their states. The DMA memory controller 110 stores the first processing states S1 and S2 of a currently running first task T1 in the first process control block PCB1. The DMA controller 110 accesses from the second process control block PCB2, second processing states S1' and S2' of a second task T2 to be performed by the custom functional units FU1 and FU2, which the DMA memory controller 110 preemptively loads in the respective custom functional units FU1 and FU2. Preemptive task context switching of the processor, including custom functional units FU1 and FU2 is thereby enabled for real time multitasking, in accordance with an example embodiment of the invention.

A custom functional unit performs only certain instructions, so typically it performs only part of the task. For example, a task may consist of a load-store instruction (performed by an LSU), integer arithmetic (performed by an integer ALU implemented as a normal (non-customized) functional unit, and application specific special instructions (performed by custom functional units optimized for those instructions)

The transport triggered architecture processor 102 includes a load and store LSU functional unit, an arithmetic logic unit ALU functional unit, and a register file 106. One register file may contain multiple software-accessible registers. In the examples, LSU and ALU do not have internal states to be saved, and because the state of the register file (RF) is visible and accessible to the GCU 108, its state storing and restoring is controlled by the GCU directly.

In accordance with an example embodiment of the invention, in the transport triggered architecture 102, the application program may directly control the processors' internal buses and data transfer between functional units (FUs), register files (RFs), memory load/store units (LSUs), arithmetic logic units (ALUs), and other processor building blocks. Functional unit operation is initiated when a transaction is made to the triggering input port (marked with a cross). The program execution (instruction fetching, decoding and execution of the transactions) is controlled by the global control unit (GCU) 108. Instruction scheduling is done statically (compile time) and instruction level parallelism is exploited by using a very long instruction word (VLIW) and multiple buses to execute data transfers in parallel.

In accordance with an example embodiment of the invention, the transport triggered architecture processor 102 may provide high performance computing (such as radio baseband processing). It is easy to add custom functional units for application—specific needs, because instructions are data transfers, and thus there is no need to modify the instruction set by adding new instructions to access the added custom functional units. Computation results may be directly forwarded from a producing functional unit to a consuming functional unit, which avoids the storing of intermediate results to registers and thus allows smaller register files, better performance and lower energy consumption.

In accordance with an example embodiment of the invention, when an exception is raised that triggers the task context switch in the processor, for example, the global control unit (GCU) 108, 1. Disables further exceptions;

2. Calls the interrupt service routine (ISR). The ISR may execute a control type of code and not use custom functional units having an internal state.

3. In accordance with an example embodiment of the invention, the ISR is a timer interrupt or asynchronous event causing the real time operating system (RTOS) to switch task from the task T1 currently running in processor, to a new task T2, and space is reserved in memory 184 to store the architecturally visible, current processing state S1 and S2 of custom functional units FU1 and FU2.

4. In accordance with an example embodiment of the invention, global control unit (GCU) 108 configures the DMA memory controller 110 to store the processing state S1 of the custom functional unit FU1 and the processing state S2 of the custom functional unit FU2 in the preserved memory space location for process control block PCB1. The stored processing states S1 and S2 are attached to the other information in the task's process control block PCB1. The transport triggered processor (TTA) 102 is stalled while the DMA memory controller 110 has doing the storing.

Then the transport triggered architecture processor 102 starts to execute the interrupt service routine (ISR):

5. In accordance with an example embodiment of the invention, the real time operating system (RTOS) scheduler/dispatcher selects the next task T2 to be activated. The new processing states S1' and S2' of the selected new task T2 are accessed from its process control block PCB2 in memory where they were stored when the task T2 was suspended, loaded into the custom functional units FU1 and FU2 and the task T2, execution is continued from the state which the task T2 had when it was suspended.

6. In accordance with an example embodiment of the invention, later, the RTOS may restore the original processing states S1 and S2 of the preempted, first task T1 in the custom functional units FU1 and FU2, so that its execution may continue. The original processing states S1 and S2 are accessed from the process control block PCB1 in memory. The original processing states S1 and S2 may include the architecturally visible internal states of the custom functional units FU1 and FU2 stored when the first task T1 was preempted.

7. Processor then continues execution of the first task T1.

In accordance with an example embodiment of the invention, each custom functional unit FU1 and FU2 may have an additional port B1 and B2, respectively, visible for the DMA memory controller 110, providing read/write access to the custom functional units' state, S1 and S2, respectively. To avoid the storing of large context and minimize the task switching penalty, the above steps 3-4) and 6) may be augmented with the following features.

In accordance with an example embodiment of the invention, to avoid the storing of large context and minimize the task switching penalty, some functional units FU1 and/or FU2 may be optimized for specialized tasks (e.g. complex number arithmetic, FFT, scrambling sequence generation), so they may not be needed while executing other kind of code.

In accordance with an example embodiment of the invention, the DMA memory controller 110 may first store the states of a pre-specified subset of functional units (ones which are commonly used to execute instructions. In accordance with an example embodiment of the invention, states of all functional units may be handled with a "lazy saving" manner, meaning that the state of a custom functional unit is not saved during the context switch, but just before a second task T2 starts to use that custom functional unit. In accordance with an example embodiment of the invention, the pre-specified subset of the commonly used functional units may be empty, in which case the state saving of all custom functional units may be handled with a lazy saving manner.

In accordance with an example embodiment of the invention, the DMA memory controller 110 restores the custom functional unit states that were valid (e.g. functional unit was in use) when the task to be continued was pre-empted, and then returns control to the processor which then continues executing the new task.

In accordance with an example embodiment of the invention, the states of the not-saved functional units may be stored either opportunistically in background, or on-demand (state is saved only when the processor wants to use the functional unit).

In accordance with an example embodiment of the invention, each functional unit has an additional status wire (called "busy") indicating if its state waits to be saved. If the processor wants to use the functional unit with busy status bit asserted, the processor is stalled until the DMA saves the functional units state. This process in described in details in the next chapter.

In accordance with an example embodiment of the invention, a custom functional unit may have shadow registers or other kind of local memory to store a copy of its state. When a context switch occurs, the custom functional unit may store its processing state in the shadow registers and start to execute commands from a new task immediately after the state storing is done. While the custom functional unit is executing commands from a new task, the DMA memory controller 110 may simultaneously access the stored copy of the state to perform the custom functional unit state saving in the program control block of the suspended task.

In accordance with an example embodiment of the invention, the state of the custom FU waiting to be saved may be stored to a temporary local memory (e.g. shadow registers), after which the custom FU may immediately continue execution while the copy of the state saved in the local temporary memory, is saved to the PCB. This reduces latency and the expense of silicon area. If shadow registers are used, the state may be copied in one clock cycle, so the FU may continue with a new task immediately while the final saving from shadow registers to PCB is done simultaneously on background.

In accordance with an example embodiment of the invention, to avoid the storing of large context and minimize the task switching penalty, instead of saving the whole state of each functional unit, the processor may use variable-length format to save only the part of the functional unit state which is in use.

In accordance with an example embodiment of the invention, each functional unit supporting partial state saving has an output port indicating the size of its active state. The DMA memory controller 110 stores that size info in the program control block, followed by the functional unit active state.

In accordance with an example embodiment of the invention, in FIG. 1, the memory 184 for storage is allocated from the common data memory address space (the same that is accessed by the functional unit LSU 112 using connection A to load and store data during the task execution). The RTOS allocates space from the main memory 184 to store process control blocks (PCBs) of active tasks. The space may be expanded if the number of simultaneously active tasks exceeds what fits into the initially allocated space. When the task switch is started for custom functional unit FU1, for example, the global control unit (GCU) 108 configures the DMA memory controller 110 using the control interface D, to store the architecturally visible state S1 of custom functional unit FU1, to the PCB space PCB1 of the current task T1 running in processor. In the simplest form, the control information in bus D is the starting address (in the correct PCB)

pointing to the location in the memory 184 preserved for the processing state S1 storage. Each custom functional unit FU1 and FU2 with an architecturally visible internal processing state, provides an interface to read and write the processing state, to the DMA memory controller 110 via connections B1 and B2, respectively. The DMA memory controller 110 reads the processing states and stores them to the memory 184. While DMA memory controller 110 is saving the state, the transport triggered architecture processor 102 may be suspended, which may increase the context switch time, however this effect may be minimized by applying the optimizations described above. When DMA memory controller 110 has finished the state saving, global control unit (GCU) 108 configures it to restore the architectural state of the next task context by sending an address pointing to the functional unit's processing state space of the new task's PCB in memory 184. After the DMA memory controller 110 has finished context restoring, the global control unit (GCU) 108 may continue to finish the context switch and the processor may continue executing the new task.

In an example embodiment of the invention, the memory bus 12 may be connected to the host device 180, such as a network element, direct memory access (DMA) controller, microcontroller, digital signal processor, or memory controller. The term "host device", as used herein, may include any device that may initiate accesses to slave devices, and should not be limited to the examples given of network element, direct memory access (DMA) controller, microcontroller, digital signal processor, or memory controller. In an example embodiment of the invention, memory bus 12 may be connected to any kind of peripheral interface 182, such as camera, display, audio, keyboard, or serial interfaces. The term "peripheral interface", as used herein, may include any device that may be accessed by a processor or a host device, and should not be limited to the examples given of camera, display, audio, keyboard, or serial interfaces, in accordance with at least one embodiment of the present invention.

Figure 9:
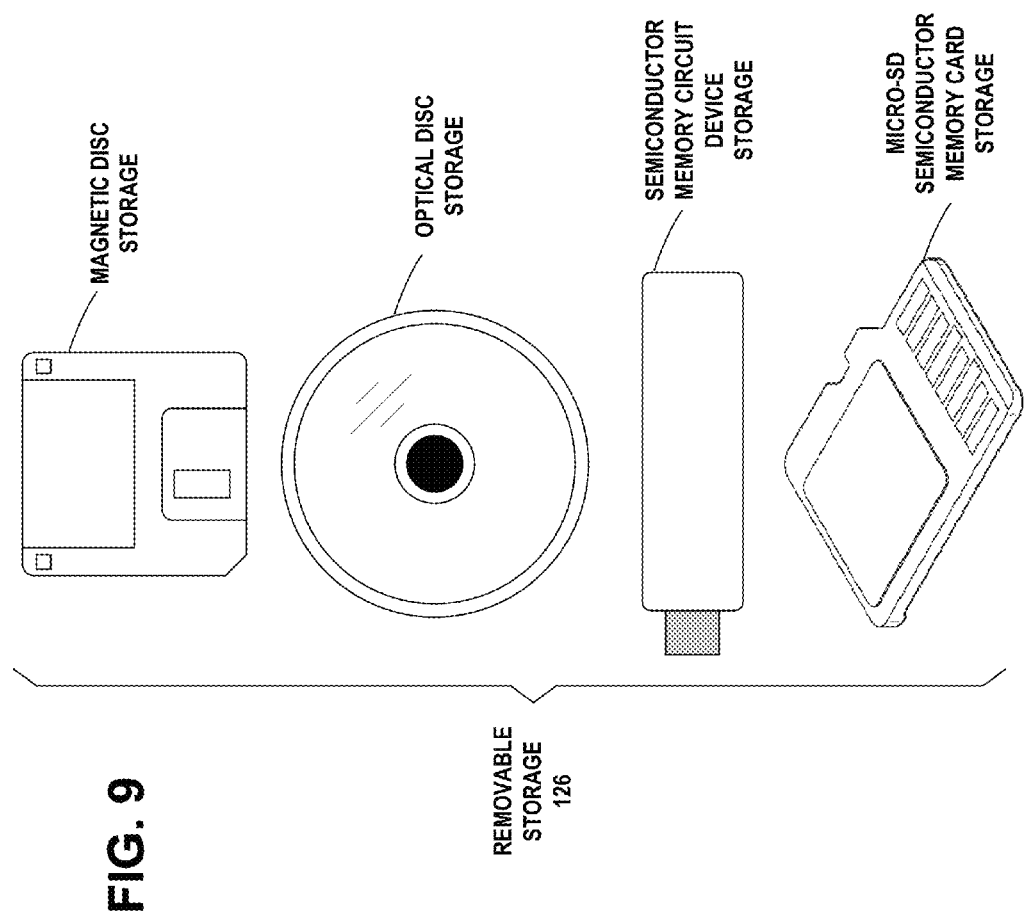
FIG. 9 illustrates an example embodiment of the invention, wherein examples of removable storage media are shown, based on magnetic, electronic and/or optical technologies, such as magnetic disks, optical disks, semiconductor memory circuit devices, and micro-SD semiconductor memory cards (SD refers to the Secure Digital standard) for storing data and/or computer program code as an example computer program product, in accordance with at least one embodiment of the present invention.

In an example embodiment of the invention, the memory bus 12 may be connected to a removable storage 126 shown in FIG. 9, based on magnetic, electronic and/or optical technologies such as magnetic disks, optical disks, semiconductor memory circuit devices, and micro-SD semiconductor memory cards (SD refers to the Secure Digital standard) that may serve, for instance, as a program code and/or data input/output means.

In an example embodiment of the invention, if lazy state storing is used, there may be no need to suspend the transport triggered architecture processor (102) for state saving. The global control unit (GCU) 108 may merely indicate the address for the old and new PCBs to DMA memory controller 110. If opportunistic state storing is used, DMA memory controller 110 continues to process state storing in the background while the custom functional unit FU1 or FU2 executes the commands of a task. If on-demand state storing is used, DMA memory controller 110 stores the processing state only when FU1 or FU2 indicates that the storing is needed. This may happen when both of the two conditions are met:

When the old task was interrupted, FU1 or FU2 was in an internal state that reflects the current task's computation results; and The state in FU1 or FU2 for the context of the old task has not yet been saved.

In an example embodiment of the invention, FU1 and FU2 are keeping track of both conditions. The benefit is that the transport triggered architecture processor 102 is suspended for DMA memory controller 110 transfer only when needed, and the processing state for the new task will overwrite the architecturally visible state of the old task.

FIG. 2A illustrates an example embodiment of the invention, of the global control unit (GCU) 108 of FIG. 1, in accordance with an example embodiment of the invention. The global control unit (GCU) 108 controls the program execution by fetching instructions with instruction fetch 205 from the real time operating system (RTOS) 202 tasks and application 204 tasks T1 and T2, decoding instructions with instruction decoder 208, triggering transactions with controller 212 on processor bus 14, and configuring DMA memory controller 110 to perform context switch. The global control unit (GCU) 108 includes the program counter register 203, the instruction register 206, the instruction decoder 208, the controller 212, and the output register 214 to send commands to DMA memory controller 110. When a task switch for FU1 is to be performed, the global control unit (GCU) 108 performs the steps of:

[1] send preemptive task switch command to DMA memory controller 110 for PCB1 & PCB 2;

[2] send command to transport triggered architecture processor 102 components to suspend the processor and wait DMA unit to finish its actions to perform the context switch;

[3] send command to transport triggered architecture processor 102 components to continue execution Context switch information I1 in step [1] identifying PCB1 and PCB 2, task1 and task 2, is sent to the DMA memory controller over connection D. Context switch commands in steps [2] and [3] are sent to transport triggered architecture processor 102 components over the bus 14.

Figure 3:
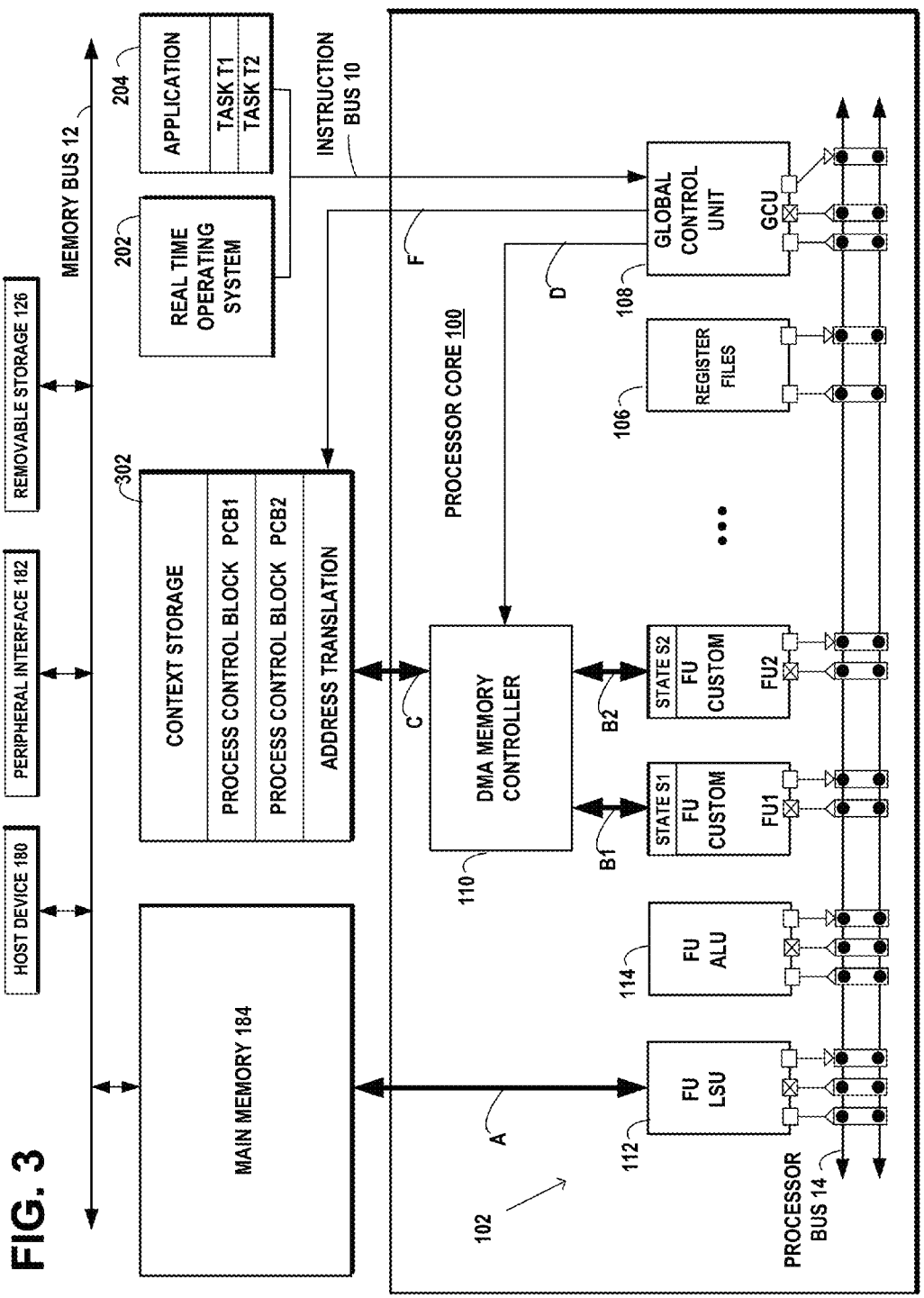
FIG. 3 illustrates an example embodiment of the invention, of the system architecture of FIG. 1, showing the transport triggered architecture (TTA) processor and the global control unit (GCU), managing the context storage memory allocation for direct memory access (DMA) to use context storage separate from the main memory, to store the first and second process control blocks for the one or more custom functional units in accordance with an example embodiment of the invention.

In an example embodiment of the invention, task identifiers may be used to locate the PCB in memory for example by using an address translator, as shown in FIG. 3, for example, converting a tuple <FU-ID, Task-ID> to a memory address pointing to the location in Tasks-ID's PCB where the processing state of a custom FU identified by FU-ID may be stored.

In an example embodiment of the invention, the address may be obtained from the operating system, in which case the PCB addresses are included in the information message.

FIG. 2B illustrates an example embodiment of the invention, of a custom functional unit FU1 of FIG. 1, illustrating a processor state S1, in accordance with an example embodiment of the invention. In an example embodiment of the invention, custom functional units FU1 and FU2 do not run their own task, but compute one or more application specific instructions for which they are designed. The custom functional units FU1 and FU2 receive the instructions, one-by-one, from the processor bus 14. In an example embodiment of the invention, the respective processing state S1 and S2 of the custom functional units FU1 and FU2, may comprise, for example the state of the pipeline register (if pipelined computation is used), the state of any intermediate results (if hardware looping is used), or the state of some internal registers that may hold their values between the execution of separate instructions.

In an example embodiment of the invention, input from the processor bus 14 to the triggering data port 222 triggers the custom functional unit FU1 to start computing the instruction input to the instruction op-code port 224. If the custom functional unit FU1 implements multiple instructions or variants of instructions, the bus transaction includes an instruction opcode to identify the instruction, which is decoded in the instruction decoder 226. New data in triggering port 222 starts instruction decoding and optional evaluation of FU status signals (dashed lines from triggering ports 222 and 224.) The FU status control 228 sets outgoing "busy" 230 and "start_use" wires 231 based on the rules described below. In addition, if "context switched" 232 is asserted, FU status control 228 deasserts the "run" wire 234 to the computation logic 236 to make it stop computation and hold its state, to enable making time for the DMA memory controller 110 to store the old state S1 and restore the new state S1' by using state I/O connection B1, if needed.

In accordance with an example embodiment of the invention, a custom functional unit F1 may include the local temporary state memory 242 as a shadow register to store a copy of its state S1 for a currently running first task T1. When a context switch occurs, the custom functional unit F1 may store its processing state S1 in the local temporary state memory 242, load a second state S2 for a new task T2, and start to execute commands from the new task T2 immediately after the state S1 is stored in the local temporary state memory 242. While the custom functional unit FU1 is executing commands from the new task T2, the DMA memory controller 110 may simultaneously access the stored copy of the state S1 from the local temporary state memory 242, to perform saving of S1 in the program control block PCB1 in main memory 184. In accordance with an example embodiment of the invention, a temporary state memory 242' may be included in the DMA memory controller 110 to perform a similar function as the local temporary state memory 242 in the custom functional unit F1.

In accordance with an example embodiment of the invention, processing state size 238 may be indicated if variable-size state storing is used. The custom functional unit FU1 may include optional components, such as a status wire control 230 for lazy state storing, and state size output 238 for variable state storing.

FIG. 2C illustrates an example embodiment of the invention, of a DMA memory controller 110 of FIG. 1, in accordance with an example embodiment of the invention. The DMA memory controller 110 may include the DMA memory controller program 252, the instruction register 254, the instruction decoder 256, the control memory 258, the controller 260, and the output buffer 262 to write the processing state S1 to the memory 184. The DMA memory controller 110 also includes the storage 264 for storing DMA bookkeeping data. In accordance with an example embodiment of the invention, the DMA memory controller 110 may alternately be implemented purely as hardware state machines. In accordance with an example embodiment of the invention, a temporary state memory 242' may be included in the DMA memory controller 110 to perform a similar function as the local temporary state memory 242 in the custom functional unit F1.

When a task switch for FU1 is to be performed, the DMA memory controller 110 performs the steps of:

[1] If a preemptive task switch is received identifying T1, T2, PCB1 and PCB2, then

[2] Store the first processing states S1 and S2 at PCB1 for the current task T1 running in transport triggered architecture processor;

[3] Preemptively load the second processing states S1' and S2' from PCB2 for second task T2 in transport triggered architecture processor.

Context switch command in step [1] identifying T1, T2, PCB1 and PCB2, is received from GCU 108 over connection D. In accordance with an example embodiment of the invention, if an address translation technique is used, the PCB1 and PCB2 addresses may be generated from a task ID. The processing state S1 received from FU1 over connection B1 may include, for example, the state of the pipeline register (if pipelined computation is used), the state of any intermediate results (if hardware looping is used), or the state of some internal registers that may hold their values between the execution of separate instructions. Similarly, the processing state S2 from FU2 is received over connection B2. The current processing states S1 and S2 are transmitted to the memory 184 over the connection C and stored at the address of PCB1 in step [2]. The new processing states S1' and S2' may be accessed over the same connection C from the memory 184 at the address of PCB2 and loaded in FU1 and FU2 in step [3].

FIG. 3 illustrates an example embodiment of the invention, of the system architecture of FIG. 1, showing the transport triggered architecture (TTA) processor 102 and the global control unit (GCU) 108, controlling the direct memory access (DMA) 110 to allocate memory space in a context storage 302 separate from the main memory 184, to store the first and second process control blocks PCB1 and PCB2 for custom functional units FU1 and FU2 in accordance with an example embodiment of the invention. In this example architecture, the GCU 108 manages the context storage 302 by setting an address translation to map the DMA memory controller's reads and writes to the correct custom FU space storage in context storage memory 302.

In FIG. 3, the memory for architectural storage is allocated from a dedicated memory space or context memory 302 that has room to store the processing states for multiple tasks of multiple custom functional units. The main portion of the process control block (PCB) for a task T1 or T2, may be located in the main memory 184, except for the state storage space S1 and S2. The main portion of the PCB in the main memory 184 may contain an index field pointing to the context storage space slot S1 or S2 allocated for the task T1 or T2. During a context switch, the RTOS, which keeps book about the context memory usage, configures address translation logic to forward context memory reads and writes correctly to the context data area in the FU1 for the new task and the old task, respectively.

The advantage of a dedicated context memory architecture 302 may be that when optimization is used with opportunistic data saving in the background, it may be done at full speed and in parallel while the main memory 184 is accessed by the LSU 112. In architecture of FIG. 1, the background context saving may be slowed down when both interfaces A and C are used, simultaneously.

If a task is not using custom functional units, then there may be no need to reserve space from context memory to that task, which may be indicated in a task's PCB context storage slot pointer—field. In an example embodiment of the invention, the RTOS 202 may create a new task and if all slots in context memory 302 are in use, the RTOS may command the DMA memory controller 110 to move data from the context storage 302 to main memory 184 and back when the context is needed again, for example, by using a least recently used (LRU) replacement strategy.

Figure 4:
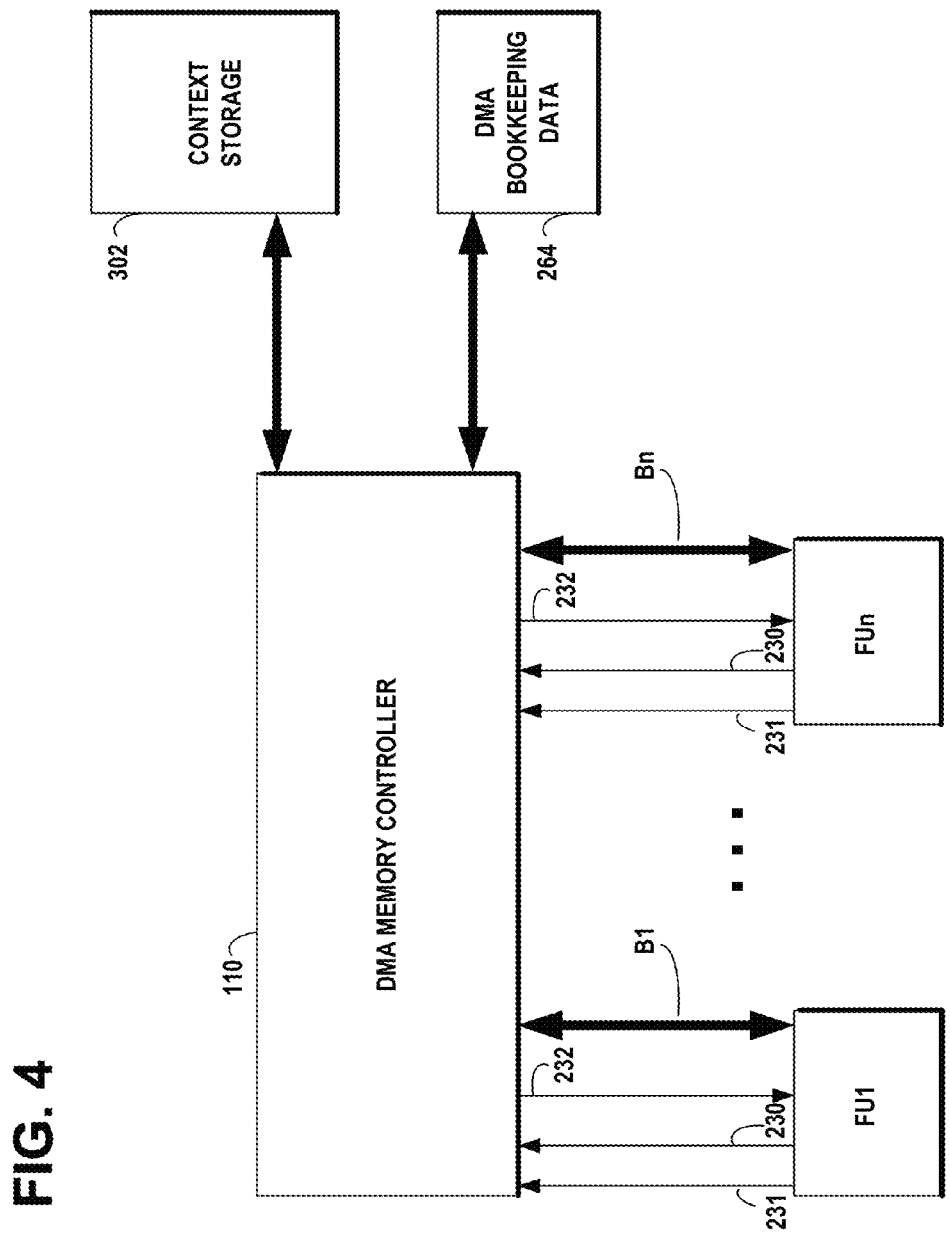
FIG. 4 illustrates an example embodiment of the invention, of an architecture supporting lazy storing. in accordance with an example embodiment of the invention.

FIG. 4 illustrates an example embodiment of the invention, of an architecture supporting lazy storing, in accordance with an example embodiment of the invention. If the lazy state saving is used, DMA memory controller 110 may need to keep track of contexts of each task using custom functional units. The functional unit (FU) is described as having a "dirty state", if one or both of the conditions hold: 1) The FU has an internal processing state that affects the future instruction execution on the FU; or 2) The FU has been triggered, but it has not finished an instruction execution. For example, if task T1 was interrupted with some custom functional unit having a "dirty" state, the next executed task T2 does not use that custom functional unit before it is interrupted, and then the task T3 executed after task T2 uses it, DMA memory controller 110 has to detect that the old state of the custom functional unit is from the context of task T1, not task T2, and store it to the PCB of task T1. This issue is faced especially when on-demand lazy storing is used. In an example embodiment of the invention, the bookkeeping of the current functional unit context is maintained in the DMA memory controller 110. An exemplary architecture including connections and data storages needed to support lazy storing is shown in FIG. 4.

In an example embodiment of the invention, the exemplary contents of bookkeeping data visible to DMA memory controller 110 are illustrated in Table 1. For each custom functional unit, there is an information field:

"functional unit context", storing the ID (0 . . . ) of the task which has its context currently active as functional units state. Initially, when the functional unit has no architecturally visible state, the flag is set to −1.

In an example embodiment of the invention, each custom functional unit with internal state has one extra input wire and two output wires:

Input "context switched" 232 is asserted by DMA memory controller 110 when context switch occurs. When the wire is asserted, the functional unit's state may not be the one currently running task needs, so the functional unit stops executing any uncompleted instructions and holds its state.

Output "busy" 230 indicates that functional unit has an architecturally visible state (it is "busy" in a sense that there is an uncompleted instruction that the functional unit is processing, or the functional unit has an internal state that affects future instruction execution). The functional unit asserts a busy flag 230 always when both or either of the conditions holds, even if its execution is frozen because of asserted "context switched" flag 232.

Output "start_use" 231 is asserted when the functional unit is triggered to execute a new instruction and "context switched" 232 is asserted. This flag 231 indicates that the functional unit is triggered, but it does not know if its state is correct. The DMA memory controller 110 detects the "start_use" flag 231, determines if the functional unit has correct state, saves the functional unit's state if needed, and de-asserts "context switched" 232 to allow the functional unit to continue.

Figure 5:
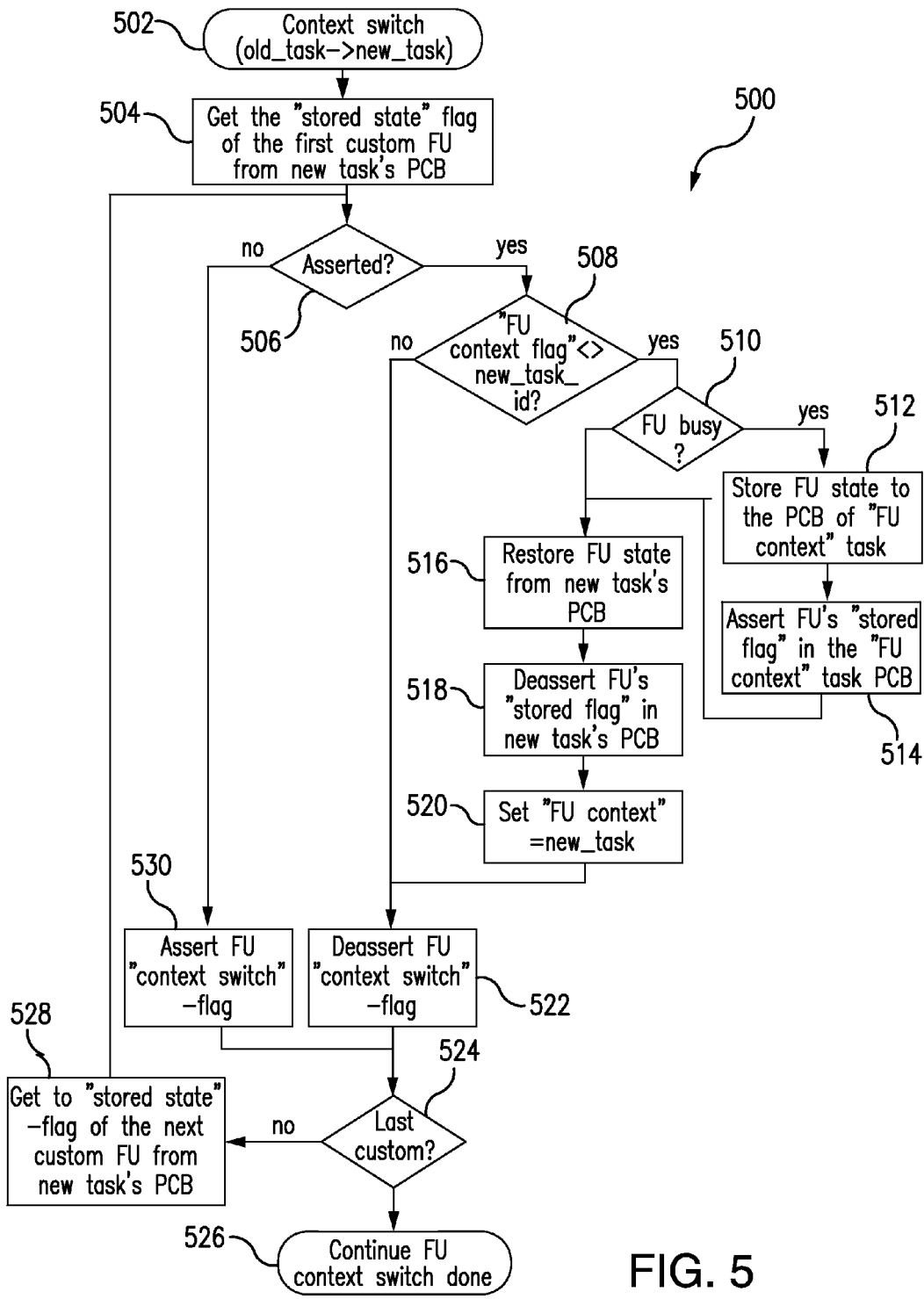
FIG. 5 illustrates an example embodiment of the invention, of a flowchart describing the DMA unit processing a context switch with the lazy storing operation. in accordance with an example embodiment of the invention.

FIG. 5 illustrates an example embodiment of the invention, wherein a flowchart 500 describes the DMA memory controller 110 processing a context switch with the lazy storing operation in accordance with an example embodiment of the invention. The detailed description how exemplary lazy context storing works is shown in flow charts in the FIGS. 5-7:

DMA memory controller 110 handling a context switch (FIG. 5).

Figure 6:
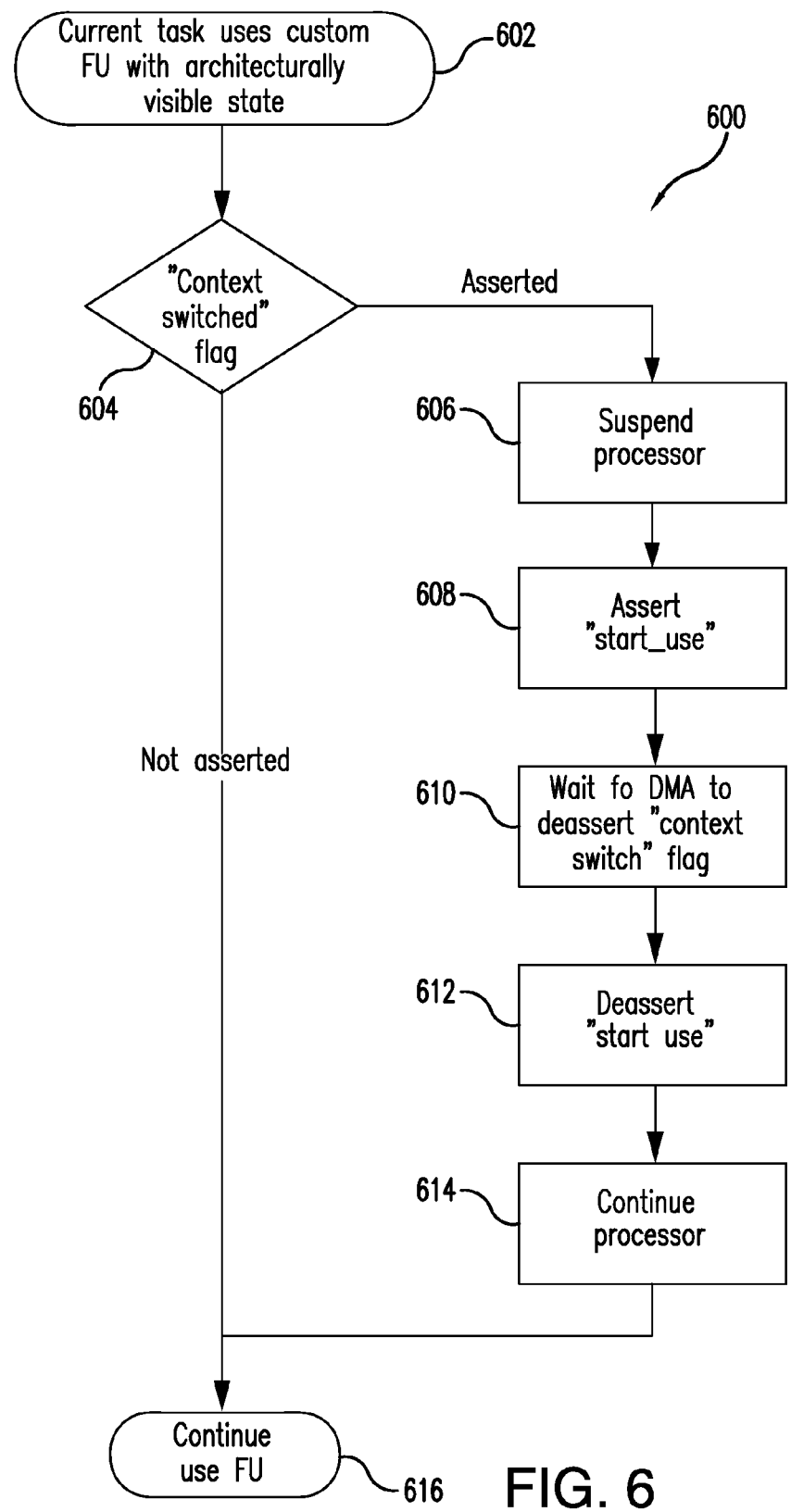
FIG. 6 illustrates an example embodiment of the invention, of a flowchart describing preemptive task switching when a new instruction is triggered and the lazy state storing operation has been employed. in accordance with an example embodiment of the invention.

New instruction triggered to functional unit (FIG. 6).

Figure 7:
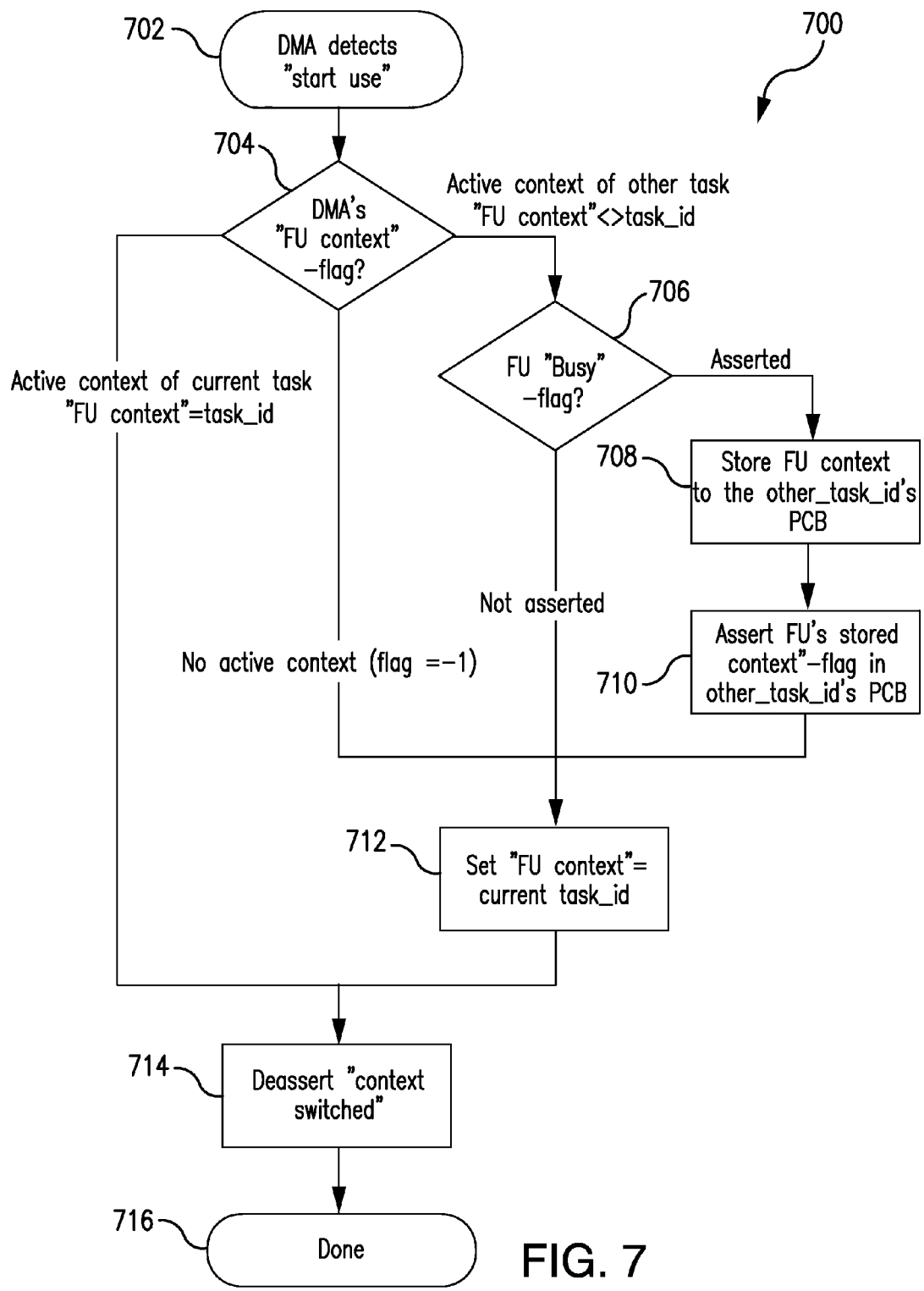
FIG. 7 illustrates an example embodiment of the invention, of a flowchart describing how the DMA controller performs a lazy store and restoration. in accordance with an example embodiment of the invention.

DMA memory controller 110 detecting that functional unit has triggered a new instruction when its state is possibly invalid (FIG. 7).

In the flow chart 500 of FIG. 5, the DMA memory controller 110 may carry out the following steps in processing a context switch with the lazy storing operation:

502: Context switch (old_task→new_task);

504: Get the "stored state"-flag of the first custom FU from new task's PCB;

506: If the "stored state"-flag is asserted, then got to step 508 else step 530

508: Determine if "FU context flag" < > new_task_id?

510: If yes, then determine if FU busy.

512: If busy, then Store FU state to the PCB of "FU context" task

514: Assert FU's "stored flag" in the "FU context" tasks PCB

516: When FU is no longer busy, then Restore FU state from new task's PCB

518: Deassert FU's "stored flag" in new task's PCB

520: Set "FU context"=new_task

522: When "FU context flag"=new_task_id, then Deassert FU "context switch"-flag

524: If this is the last FU, then 526: Custom FU context switch done,

528: Else Get to "stored state"-flag of the next custom FU from new task's PCB.

530: Assert FU "context switch"-flag

FIG. 6 illustrates an example embodiment of the invention, wherein a flowchart 600 describes preemptive task switching when a new instruction is triggered and the lazy state storing operation has been employed, in accordance with an example embodiment of the invention.

In the flow chart 600 of FIG. 6, the following steps may be carried out for preemptive task switching when a new instruction is triggered and the lazy state storing operation has been employed:

602: Current task uses custom FU with architecturally visible state

604: If "context switch"-flag is asserted, then step 606: Suspend processor else 616

608: Assert "start_use"

610: Wait for DMA to deassert "context switch"-flag

612: Deassert "start_use"

614: Continue processor

616: Then if no longer asserted, Continue to use FU.

FIG. 7 illustrates an example embodiment of the invention, wherein a flowchart 700 describes how the DMA memory controller 110 performs a lazy store and restoration, in accordance with an example embodiment of the invention.

In the flow chart 700 of FIG. 7, the DMA memory controller 110 may carry out the following steps in detecting that functional unit has triggered a new instruction when its state is possibly invalid:

702: DMA detects "start use"

704: Determine if DMA's "FU context"-flag indicates Active context of other task "FU context" < > task_id

706: If Active context of other task "FU context" < > task_id, then determine if FU "Busy"-flag is asserted

708: If FU "Busy"-flag is asserted, then Store FU context to other task_id's PCB

710: Assert FU's "stored context"-flag in other_task_id's PCB

712: Set "FU context"=current task_id

714: Deassert "context switch"

716: Done

In an example embodiment of the invention, the following invariants may be maintained:

"functional unit context" in DMA data structure indicates which task has its valid state stored as functional units current state.

The "Stored state"-flag (one for each custom functional unit) in tasks PCB indicates if a functional units state is stored in that PCB.

"functional unit busy" is asserted always if functional unit has meaningful state (indicating that the old state has to be stored if another task than the one specified in "functional unit context" data uses the functional unit)

functional unit holds its state as long as "Context switch" is asserted

If functional unit has valid state in tasks context, the state is kept either in functional unit or in tasks PCB.

TABLE 1

Bookkeeping data in DMA unit to support laze state saving

| FU | FU context |
|---|---|
| 1 | 42 |
| 2 | −1 |
| ... | |
| n | 17 |

In an example embodiment of the invention, Table 2 illustrates how the lazy on-demand state storing concept works in practice. Table 2 shows the state of tasks' FU storage in PCB, DMA bookkeeping (FU Context table), and the "context switched" and "busy" state flags/wires after the events in example have processed. In the example shown in Table 2, three tasks use the custom FUs and they executed concurrently using preemptive multitasking. The "start_use" wire is not shown because it is always de-asserted after each event. When processing the event, "start use" is temporarily asserted according to the flowchart 6 to control the behavior of DMA unit flowchart of FIG. 7. The execution is started at the initial state shown in Table 2 at the beginning. The following events take place:

1. Task#11 is started. DMA unit asserts the context switch of each custom FU

2. Task#11 triggers an instruction to FU#1. Because the "context switched"-flag is asserted, FU1 asserts "start use" which causes DMA unit to detect (and load if needed) the correct state of FU1, according to flowchart in FIG. 7. Because FU1 has not active state, no state saving needs to be done and DMA unit stores the "FU context" flag to indicate that FU1s state is now the one task #11 uses, and de-asserts FU1's "context switched"-flag to allow it to continue. FU1 starts the triggered instruction and asserts a "busy" flag to indicate that now it has a valid state.

3. Preemptive context switch activates task #12. Task #12 does not have any FU state stored in PCB, so the only thing DMA unit does is assert all "context switched"-flags. Now FU1 holds its state (valid in task 11 context).

4. Task #12 triggers an instruction on FU 2. This is done in a similar way as described for event 2.

5. Preemptive context switch activates task #13. Similar behavior than in event 3.

6. Task #13 triggers an instruction on FU1. FU1 asserts "start_use"-flag because "context switched" is asserted. Now FU1 has its state in context of task#11 and has "busy" asserted, so the state has to be saved before task #13 may use FU1. DMA unit saves the state in task#11 PCB, de-asserts "context switched" and sets "FU context" of FU1 to indicate that the FU context is now valid for task#13

7. FU1 becomes "not busy", meaning that the instructions of task#13 in FU1 are (at least temporarily) completed and FU1's internal state has not effect to its computation. FU1 de-asserts "busy" flag to indicate this.

8. Preemptive context switch activates task #11. DMA unit detects that task#11 has FU1 state saved in PCB which needs to be restored. Because FU1 has de-asserted its "busy" flag, it does not have valid state to be saved, so DMA unit loads to state saved in task#11 PCB to FU1, sets "FU context"-flag to indicate that FU1 has valid state in task#11 context, clears "stored state" flag of FU1 in task#11 PCB to indicate that the stored state is not valid anymore, and de-asserts "context switched"-flag to allow FU1 to continue.

9. Preemptive context switch activates task #12. Task#12 has no FU states stored in its PCB, so behavior is similar than in event 3.

10. Task #12 starts to use FU1 and FU2. FU2 which was in use when task#12 was previously run, still hold its valid context of task #12 because no other task has used it ("FU context" of FU2 is task#12 task id). The only thing the DMA unit has to do is to de-assert "contexts switched"-flag to allow FU2 to continue. FU1 has valid state in other task's context so its state is saved to the PCB of task#11 before it is used by task #12.

11. Preemptive context switch to task #11. Because FU1 has a stored state in PCB of task#11 and the current state in task#12 context, DMA unit first stores the FU1 state to the PCB of task #12 and then loads the FU1 state from the PCB of task#11 (according to the rightmost branch on flowchart in FIG. 5). The "context switched"-flag of FU1 may be de-asserted because it has valid state just loaded in the task#11 context. Other flags are set as in previous examples, according to flowcharts in FIGS. 5-7.

As the example of Table 2 shows, the state is kept in FU always as long as it is possible, which minimized the context switch overhead by minimizing the DMA traffic caused by state storing and restoring. Although the context switch time now varies depending on if the FU states need to be stored/restored or not, it should be notice that during the one time slice executing any task, each FU is stored and restored at most once, giving the same contribution to the worst case execution time (WCET) analysis than non-optimized solution which always stores the FU states.

TABLE 2

Example of lazy state storing

| Usage of custom FU | | Initial task bookkeeping (in tasks PCB) | | | | Initial DMA unit bookkeeping | | | |
|---|---|---|---|---|---|---|---|---|---|
| Task# | Uses FUs | Stored state | 1 | 2 | 3 | FU# | 1 | 2 | 3 |
| 11 | 1 | task #11 | 0 | 0 | 0 | FU context | −1 | −1 | −1 |
| | | task #12 | 0 | 0 | 0 | Initial FU bookkeeping | | | |
| 12 | 1, 2, 3 | task #13 | 0 | 0 | 0 | FU# | 1 | 2 | 3 |
| 13 | 1 | | | | | context switched | 0 | 0 | 0 |
| | | | | | | busy | 0 | 0 | 0 | events and state stores/restores:

| 1. task 11 is started | Stored state | 1 | 2 | 3 | FU# | 1 | 2 | 3 |
|---|---|---|---|---|---|---|---|---|
| | task #11 | 0 | 0 | 0 | FU context | −1 | −1 | −1 |

TABLE 2-continued

Example of lazy state storing

| | | | | | | | | |
|---|---|---|---|---|---|---|---|---|
| | task #12 | 0 | 0 | 0 | FU# | 1 | 2 | 3 |
| | task #13 | 0 | 0 | 0 | context switched | 1 | 1 | 1 |
| | | | | | busy | 0 | 0 | 0 |
| 2. task 11 starts to uses FU1 | Stored state | 1 | 2 | 3 | FU# | 1 | 2 | 3 |
| | task #11 | 0 | 0 | 0 | FU context | 11 | −1 | −1 |
| | task #12 | 0 | 0 | 0 | FU# | 1 | 2 | 3 |
| | task #13 | 0 | 0 | 0 | context switched | 0 | 1 | 1 |
| | | | | | busy | 1 | 0 | 0 |
| 3. CTX switch 11–>12 | Stored state | 1 | 2 | 3 | FU# | 1 | 2 | 3 |
| | task #11 | 0 | 0 | 0 | FU context | 11 | −1 | −1 |
| | task #12 | 0 | 0 | 0 | FU# | 1 | 2 | 3 |
| | task #13 | 0 | 0 | 0 | context switched | 1 | 1 | 1 |
| | | | | | busy | 1 | 0 | 0 |
| 4. Task 12 starts using FU2 | Stored state | 1 | 2 | 3 | FU# | 1 | 2 | 3 |
| | task #11 | 0 | 0 | 0 | FU context | 11 | 12 | −1 |
| | task #12 | 0 | 0 | 0 | FU# | 1 | 2 | 3 |
| | task #13 | 0 | 0 | 0 | context switched | 1 | 0 | 1 |
| | | | | | busy | 1 | 1 | 0 |
| 5. CTX switch 12–>13 | Stored state | 1 | 2 | 3 | FU# | 1 | 2 | 3 |
| | task #11 | 0 | 0 | 0 | FU context | 11 | 12 | −1 |
| | task #12 | 0 | 0 | 0 | FU# | 1 | 2 | 3 |
| | task #13 | 0 | 0 | 0 | context switched | 1 | 1 | 1 |
| | | | | | busy | 1 | 1 | 0 |
| 6. Task #13 starts using FU1 DMA: FU1 state->PCB#11 | Stored state | 1 | 2 | 3 | FU# | 1 | 2 | 3 |
| | task #11 | 1 | 0 | 0 | FU context | 13 | 12 | −1 |
| | task #12 | 0 | 0 | 0 | FU# | 1 | 2 | 3 |
| | task #13 | 0 | 0 | 0 | context switched | 0 | 1 | 1 |
| | | | | | busy | 1 | 1 | 0 |
| 7. FU1 becomes not busy | Stored state | 1 | 2 | 3 | FU# | 1 | 2 | 3 |
| | task #11 | 1 | 0 | 0 | FU context | 13 | 12 | −1 |
| | task #12 | 0 | 0 | 0 | FU# | 1 | 2 | 3 |
| | task #13 | 0 | 0 | 0 | context switched | 0 | 1 | 1 |
| | | | | | busy | 0 | 1 | 0 |
| 8. CTX switch 13–>11 DMA: PCB#11->FU1 state | Stored state | 1 | 2 | 3 | FU# | 1 | 2 | 3 |
| | task #11 | 0 | 0 | 0 | FU context | 11 | 12 | −1 |
| | task #12 | 0 | 0 | 0 | FU# | 1 | 2 | 3 |
| | task #13 | 0 | 0 | 0 | context switched | 0 | 1 | 1 |
| | | | | | busy | 1 | 1 | 0 |
| 9. CTX switch 11–>12 | Stored state | 1 | 2 | 3 | FU# | 1 | 2 | 3 |
| | task #11 | 0 | 0 | 0 | FU context | 11 | 12 | −1 |
| | task #12 | 0 | 0 | 0 | FU# | 1 | 2 | 3 |
| | task #13 | 0 | 0 | 0 | context switched | 1 | 1 | 1 |
| | | | | | busy | 1 | 1 | 0 |
| 10. Task 12 starts using FU1 and FU2 DMA: FU1->PCB11 | Stored state | 1 | 2 | 3 | FU# | 1 | 2 | 3 |
| | task #11 | 1 | 0 | 0 | FU context | 12 | 12 | −1 |
| | task #12 | 0 | 0 | 0 | FU# | 1 | 2 | 3 |
| | task #13 | 0 | 0 | 0 | context switched | 0 | 0 | 1 |
| | | | | | busy | 1 | 1 | 0 |
| 11. CTX switch 12–>11 DMA: FU1->PCB12 DMA: PCB11->FU1 | Stored state | 1 | 2 | 3 | FU# | 1 | 2 | 3 |
| | task #11 | 0 | 0 | 0 | FU context | 11 | 12 | −1 |
| | task #12 | 1 | 0 | 0 | FU# | 1 | 2 | 3 |
| | task #13 | 0 | 0 | 0 | context switched | 1 | 0 | 1 |
| | | | | | busy | 1 | 1 | 0 |

Figure 8A:
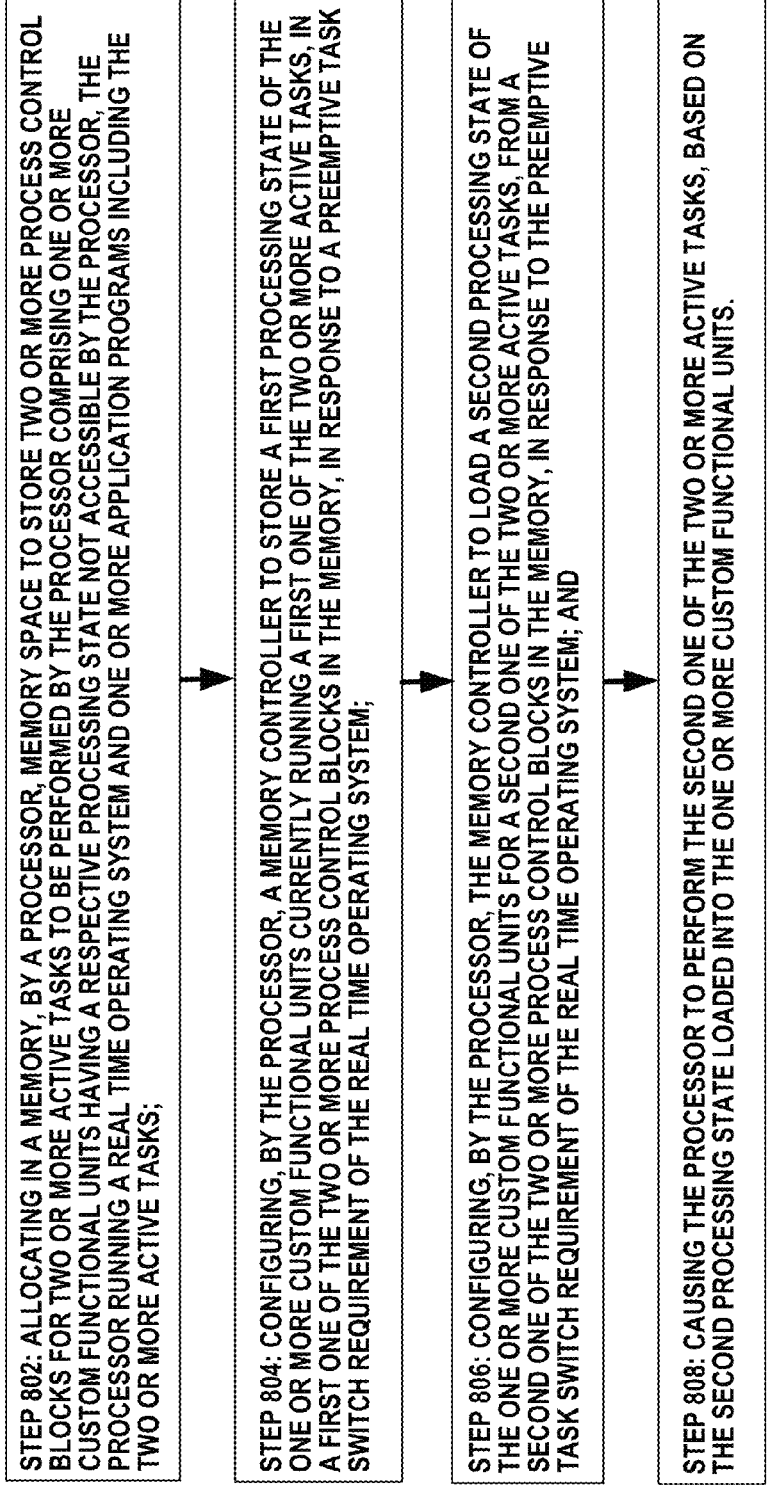
FIG. 8A illustrates an example embodiment of the invention, of an example flow diagram of the operation of the global control unit of FIG. 1, in accordance with an example embodiment of the invention.

FIG. 8A illustrates an example embodiment of the invention, of an example flow diagram 800 of the operation of the global control unit of FIG. 1, in accordance with an example embodiment of the invention. The figure illustrates an example of the procedure carried out by an apparatus in executing-in-place program code stored in the memory of the apparatus. The procedure of the flow diagram may be embodied as program logic stored in the memory of the apparatus in the form of sequences of programmed instructions which, when executed in the logic of the apparatus, carry out the functions of an exemplary disclosed embodiment. The procedure may be carried out in another order than shown and individual procedures may be combined or separated into component procedures. Additional procedures may be inserted into this sequence. The procedure follows:

Step 802: allocating in a memory, by a processor, memory space to store two or more process control blocks for two or more active tasks to be performed by the processor comprising one or more custom functional units having a respective processing state not accessible by the processor, the processor running a real time operating system and one or more application programs including the two or more active tasks;

Step 804: configuring, by the processor, a memory controller to store a first processing state of the one or more custom functional units currently running a first one of the two or more active tasks, in a first one of the two or more process control blocks in the memory, in response to a preemptive task switch requirement of the real time operating system;

Step 806: configuring, by the processor, the memory controller to load a second processing state of the one or more custom functional units for a second one of the two or more active tasks, from a second one of the two or more process control blocks in the memory, in response to the preemptive task switch requirement of the real time operating system; and Step 808: causing the processor to perform the second one of the two or more active tasks, based on the second processing state loaded into the one or more custom functional units.

FIG. 8B illustrates an example embodiment of the invention, of an example flow diagram 850 of the operation of the DMA memory controller of FIG. 1, in accordance with an example embodiment of the invention. The figure illustrates an example of the procedure carried out by an apparatus in executing-in-place program code stored in the memory of the apparatus. The procedure of the flow diagram may be embodied as program logic stored in the memory of the apparatus in the form of sequences of programmed instructions which, when executed in the logic of the apparatus, carry out the functions of an exemplary disclosed embodiment. The procedure may be carried out in another order than shown and individual procedures may be combined or separated into component procedures. Additional procedures may be inserted into this sequence. The procedure follows:

Step 852: storing, by a memory controller, a processing state of one or more custom functional units of a processor currently running a first one of two or more active tasks, in a first one of two or more process control blocks in a memory, in response to a preemptive task switch requirement, the one or more custom functional units that are parts of an application-specific instruction-set processor having a respective processing state not accessible by a processor running a real time operating system and one or more application programs including the two or more active tasks; and Step 854: preemptively loading, by the memory controller, the processing state of the one or more custom functional units with a second one of the two or more active tasks, from a second one of the two or more process control blocks in the memory, in response to the preemptive task switch requirement of the real time operating system, to enable the one or more custom functional units to perform the second one of the two or more active tasks.

FIG. 9 illustrates an example embodiment of the invention, wherein examples of removable storage media 126 are shown, based on magnetic, electronic and/or optical technologies, such as magnetic disks, optical disks, semiconductor memory circuit devices and micro-SD semiconductor memory cards (SD refers to the Secure Digital standard), for storing data and/or computer program code as an example computer program product, in accordance with at least one embodiment of the present invention.

Figure 10C:
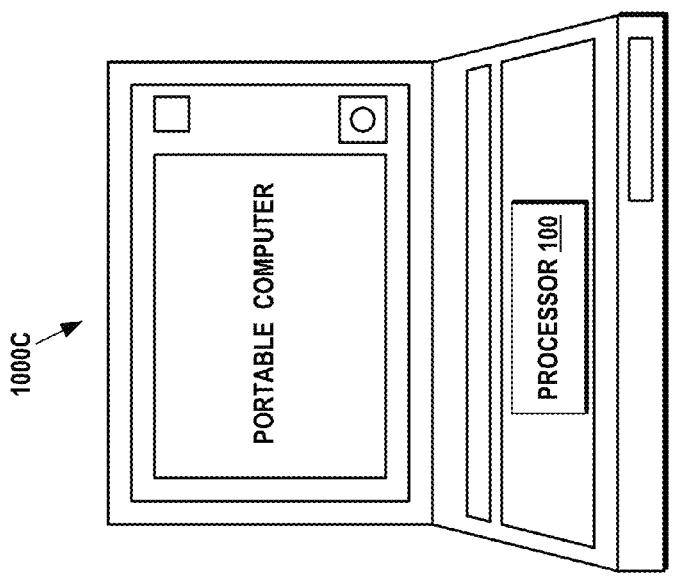
FIG. 10C illustrates an example embodiment of the invention, wherein the processor of FIG. 1 is a component of a portable computer, in accordance with at least one embodiment of the present invention.
Figure 10B:
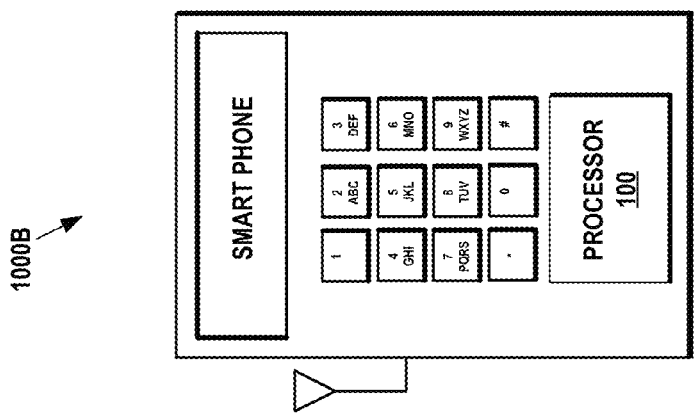
FIG. 10B illustrates an example embodiment of the invention, wherein the processor of FIG. 1 is a component of a smart phone, in accordance with at least one embodiment of the present invention.
Figure 10A:
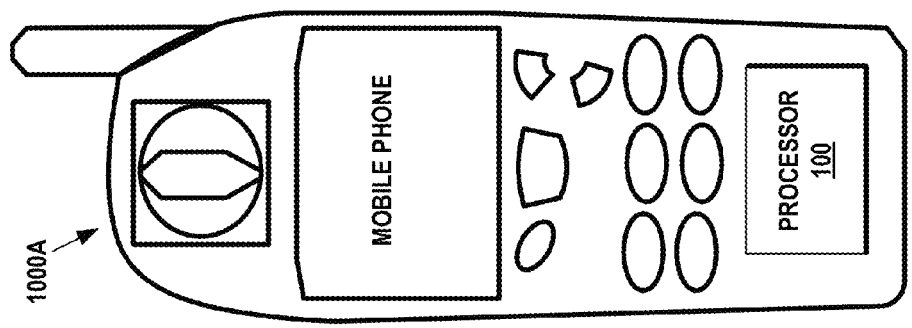
FIG. 10A illustrates an example embodiment of the invention, wherein the processor of FIG. 1 is a component of a mobile phone, in accordance with at least one embodiment of the present invention.

In example embodiments of the invention, the processor 100 is a component, through a peripheral interface 182, of an electronic device, such as for example a mobile phone 1000A shown in FIG. 10A, a smart phone 1000B shown in FIG. 10B, or a portable computer 1000C shown in FIG. 10C, in accordance with at least one embodiment of the present invention.

In an example embodiment of the invention, an apparatus comprises:

means for allocating in a memory, by a processor, memory space to store two or more process control blocks for two or more active tasks to be performed by the processor comprising one or more custom functional units having a respective processing state not accessible by the processor, the processor running a real time operating system and one or more application programs including the two or more active tasks;

means for configuring, by the processor, a memory controller to store a first processing state of the one or more custom functional units currently running a first one of the two or more active tasks, in a first one of the two or more process control blocks in the memory, in response to a preemptive task switch requirement of the real time operating system;

means for configuring, by the processor, the memory controller to load a second processing state of the one or more custom functional units for a second one of the two or more active tasks, from a second one of the two or more process control blocks in the memory, in response to the preemptive task switch requirement of the real time operating system; and means for causing the processor to perform the second one of the two or more active tasks, based on the second processing state loaded into the one or more custom functional units.

In an example embodiment of the invention, an apparatus comprises:

means for storing, by a memory controller, a processing state of one or more custom functional units of a processor currently running a first one of two or more active tasks, in a first one of two or more process control blocks in a memory, in response to a preemptive task switch requirement, the one or more custom functional units that are parts of an application-specific instruction-set processor having a respective processing state not accessible by a processor running a real time operating system and one or more application programs including the two or more active tasks; and means for preemptively loading, by the memory controller, the processing state of the one or more custom functional units with a second one of the two or more active tasks, from a second one of the two or more process control blocks in the memory, in response to the preemptive task switch requirement of the real time operating system, to enable the one or more custom functional units to perform the second one of the two or more active tasks.

In an example embodiment of the invention, an apparatus comprises:

means for reading, by a processor, a status indication of one or more custom functional units indicating whether a first processing state of the one or more custom functional units currently running a first one of two or more active tasks, is waiting to be saved in a main memory;

means for causing the first processing state to be copied into a local temporary state memory;

means for allowing the one or more custom functional units to continue execution of a second one of the two or more active tasks; and means for causing the first processing state to be transferred to the main memory from the local temporary state memory during background while the one or more custom functional units continue executing the second one of the two or more active tasks.

Using the description provided herein, the embodiments may be implemented as a machine, process, or article of manufacture by using standard programming and/or engineering techniques to produce programming software, firmware, hardware or any combination thereof.

Any resulting program(s), having computer-readable program code, may be embodied on one or more computer-usable media such as resident memory devices, smart cards or other removable memory devices, or transmitting devices, thereby making a computer program product or article of manufacture according to the embodiments. As such, the terms "article of manufacture" and "computer program product" as used herein are intended to encompass a computer program that exists permanently or temporarily on any computer-usable, non-transitory medium.

As indicated above, memory/storage devices include, but are not limited to, disks, optical disks, removable memory devices such as smart cards, subscriber identity modules (SIMs), wireless identification modules (WIMs), semiconductor memories such as random access memories (RAMs), read only memories (ROMs), programmable read only memories (PROMs), etc. Transmitting mediums include, but are not limited to, transmissions via wireless communication networks, the Internet, intranets, telephone/modem-based network communication, hard-wired/cabled communication network, satellite communication, and other stationary or mobile network systems/communication links.

Although specific example embodiments have been disclosed, a person skilled in the art will understand that changes may be made to the specific example embodiments without departing from the spirit and scope of the invention.

What is claimed is:

1. A method, comprising:

allocating in a memory, by a processor, memory space to store two or more process control blocks for two or more active tasks to be performed by the processor comprising one or more custom functional units having a respective processing state not accessible by the processor, the processor running a real time operating system and one or more application programs including the two or more active tasks;

configuring, by the processor, a memory controller to store a first processing state of the one or more custom functional units currently running a first one of the two or more active tasks, in a first one of the two or more process control blocks in the memory, in response to a preemptive task switch requirement of the real time operating system;

configuring, by the processor, the memory controller to load a second processing state of the one or more custom functional units for a second one of the two or more active tasks, from a second one of the two or more process control blocks in the memory, in response to the preemptive task switch requirement of the real time operating system;

causing the processor to perform the second one of the two or more active tasks, based on the second processing state loaded into the one or more custom functional units;

reading, by the processor, a status indication of the one or more custom functional units indicating whether a first processing state of the one or more custom functional units currently running a first one of two or more active tasks, is waiting to be saved in a main memory;

causing the first processing state to be copied into a temporary state memory;

allowing the one or more custom functional units to continue execution of a second one of the two or more active tasks; and causing the first processing state to be transferred to the main memory from the temporary state memory during background while the one or more custom functional units continue executing the second one of the two or more active tasks.

2. The method of claim 1, wherein the memory controller stores in the memory prior to the configuring of the memory controller, commonly required portions of the processing state of the one or more custom functional units.

3. The method of claim 1, wherein the memory controller stores in the memory during background operations the processing state of the one or more custom functional units; and causing the memory controller to maintain a record of the portions of the processing state stored in the memory.

4. The method of claim 1, further comprising:

configuring, by the processor, the memory controller to store the second processing state of the one or more custom functional units currently running the second one of the two or more active tasks, in the second one of the two or more process control blocks in the memory, in response to a second preemptive task switch requirement of the real time operating system;

configuring, by the processor, the memory controller to preemptively load the first processing state of the one or more custom functional units, for the first one of the two or more active tasks, from the first one of the two or more process control blocks in the memory, in response to the second preemptive task switch requirement of the real time operating system; and causing the processor to resume performing the first one of the two or more active tasks, based on the first processing state loaded into the one or more custom functional units.

5. The method of claim 1, further comprising:

reading, by the processor, a status indication of the one or more custom functional units indicating whether the processing state of the one or more custom functional units is waiting to be saved; and stalling, by the processor, the one or more custom functional units until the memory controller saves the processing state of the one or more custom functional units, if status indication indicates that the processing state is waiting to be saved.

6. The method of claim 1, further comprising:

configuring, by the processor, the memory controller to store in the memory a portion of the processing state that is in use, the portion having a size indicated by size information, to store the size information and the portion of the processing state in a process control block in the memory.

7. The method of claim 1, further comprising:

causing the memory controller to store the first processing state of one or more custom functional units, in the first one of two or more process control blocks in the memory, in response to a preemptive task switch requirement; and causing the memory controller to preemptively load the second processing state of the one or more custom functional units for the second one of the two or more active tasks, from the second one of the two or more process control blocks in the memory, in response to the preemptive task switch requirement, to enable the processor to perform the second one of the two or more active tasks.

8. The method of claim 1, wherein the memory controller has previously stored in the memory commonly required portions of the processing state of the one or more custom functional units.

9. The method of claim 1, wherein the memory controller stores in the memory during background operations, of the processing state of the one or more custom functional units; and
  causing the memory controller to maintain a record of the portions of the processing state stored in the memory.

10. The method of claim 1, further comprising:
  causing the memory controller to maintain a record of processing states of the one or more custom functional units to determine at least one of whether the one or more custom functional units has a current processing state that affects future instruction execution on the one or more custom functional units and whether the one or more custom functional units has received an indication of a new preemptive task switch requirement, but the one or more custom functional units has not finished a current instruction execution for a current task;
  causing the one or more custom functional units to stop executing any uncompleted current instructions for the current task, if the current processing state of the one or more custom functional units is not a correct processing state needed to perform a new task for the new preemptive task switch requirement;
  causing the memory controller to save the current processing state of the one or more custom functional units, and
  causing the memory controller to load the correct processing state into the one or more custom functional units to perform the new task.

11. An apparatus, comprising:
  at least one processor;
  at least one memory including computer program code;
  the at least one memory and the computer program code configured to, with the at least one processor, cause the apparatus at least to:
  allocate in a memory, memory space to store two or more process control blocks for two or more active tasks to be performed by a processor comprising one or more custom functional units having a respective processing state not accessible by the processor, the processor running a real time operating system and one or more application programs including the two or more active tasks;
  configure a memory controller to store a first processing state of the one or more custom functional units currently running a first one of the two or more active tasks, in a first one of the two or more process control blocks in the memory, in response to a preemptive task switch requirement of the real time operating system;
  configure the memory controller to load a second processing state of the one or more custom functional units for a second one of the two or more active tasks, from a second one of the two or more process control blocks in the memory, in response to the preemptive task switch requirement of the real time operating system;
  perform the second one of the two or more active tasks, based on the second processing state loaded into the one or more custom functional units;
  read a status indication of the one or more custom functional units indicating whether a first processing state of the one or more custom functional units currently running a first one of two or more active tasks, is waiting to be saved in a main memory;
  cause the first processing state to be copied into a temporary state memory;
  allow the one or more custom functional units to continue execution of a second one of the two or more active tasks; and
  cause the first processing state to be transferred to the main memory from the temporary state memory during background while the one or more custom functional units continue executing the second one of the two or more active tasks.

12. The apparatus of claim 11, wherein the memory controller stores in the memory prior to the configuring of the memory controller, commonly required portions of the processing state of the one or more custom functional units.

13. The apparatus of claim 11, wherein the memory controller stores in the memory during background operations, the processing state of the one or more custom functional units; and
  the at least one memory and the computer program code configured to, with the at least one processor, cause the apparatus at least to:
  cause the memory controller to maintain a record of the portions of the processing state stored in the memory.

14. The apparatus of claim 11, further comprising:
  the at least one memory and the computer program code configured to, with the at least one processor, cause the apparatus at least to:
  configure the memory controller to store the second processing state of the one or more custom functional units currently running the second one of the two or more active tasks, in the second one of the two or more process control blocks in the memory, in response to a second preemptive task switch requirement of the real time operating system;
  configure the memory controller to preemptively load the first processing state of the one or more custom functional units, for the first one of the two or more active tasks, from the first one of the two or more process control blocks in the memory, in response to the second preemptive task switch requirement of the real time operating system; and
  resume performing the first one of the two or more active tasks, based on the first processing state loaded into the one or more custom functional units.

15. The apparatus of claim 11, further comprising:
  the at least one memory and the computer program code configured to, with the at least one processor, cause the apparatus at least to:
  read a status indication of the one or more custom functional units indicating whether the processing state of the one or more custom functional units is waiting to be saved; and
  stall the one or more custom functional units until the memory controller saves the processing state of the one or more custom functional units, if status indication indicates that the processing state is waiting to be saved.

16. The apparatus of claim 11, further comprising:
  the at least one memory and the computer program code configured to, with the at least one processor, cause the apparatus at least to:
  configure the memory controller to store in the memory a portion of the processing state that is in use, the portion having a size indicated by size information, to store the size information and the portion of the processing state in a process control block in the memory.

17. The apparatus of claim 11, further comprising:
  the at least one memory and the computer program code configured to, with the at least one processor, cause the apparatus at least to:
  cause the memory controller to maintain a record of processing states of the one or more custom functional units to determine at least one of whether the one or more custom functional units has a current processing state that affects future instruction execution on the one or more custom functional units and whether the one or more custom functional units has received an indication of a new preemptive task switch requirement, but the one or more custom functional units has not finished a current instruction execution for a current task;

cause the one or more custom functional units to stop executing any uncompleted current instructions for the current task, if the current processing state of the one or more custom functional units is not a correct processing state needed to perform a new task for the new preemptive task switch requirement;

cause the memory controller to save the current processing state of the one or more custom functional units, and cause the memory controller to load the correct processing state into the one or more custom functional units to perform the new task.

18. The apparatus of claim 11, wherein the one or more custom functional units are parts of an application-specific instruction-set processor.

19. A computer program product comprising computer executable program code recorded on a computer readable, non-transitory storage medium, the computer executable program code comprising:

code for allocating in a memory, by a processor, memory space to store two or more process control blocks for two or more active tasks to be performed by a processor comprising one or more custom functional units having a respective processing state not accessible by the processor, the processor running a real time operating system and one or more application programs including the two or more active tasks;

code for configuring, by the processor, a memory controller to store a first processing state of the one or more custom functional units currently running a first one of the two or more active tasks, in a first one of the two or more process control blocks in the memory, in response to a preemptive task switch requirement of the real time operating system;

code for configuring, by the processor, the memory controller to load a second processing state of the one or more custom functional units for a second one of the two or more active tasks, from a second one of the two or more process control blocks in the memory, in response to the preemptive task switch requirement of the real time operating system;

code for causing the processor to perform the second one of the two or more active tasks, based on the second processing state loaded into the one or more custom functional units;

code for reading, by the processor, a status indication of the one or more custom functional units indicating whether a first processing state of the one or more custom functional units currently running a first one of two or more active tasks, is waiting to be saved in a main memory;

code for causing the first processing state to be copied into a temporary state memory;

code for allowing the one or more custom functional units to continue execution of a second one of the two or more active tasks; and code for causing the first processing state to be transferred to the main memory from the temporary state memory during background while the one or more custom functional units continue executing the second one of the two or more active tasks.

* * * * *